United States Patent
Badillo et al.

(10) Patent No.: US 7,597,225 B2
(45) Date of Patent: *Oct. 6, 2009

(54) CARRYING CASE WITH SELECTIVELY ADJUSTABLE STAND

(75) Inventors: Paul Badillo, Littleton, CO (US); Sandra Martinez, Littleton, CO (US)

(73) Assignee: Intelligent Designs 2000 Corp., Commerce City, CO (US)

( * ) Notice: Subject to any disclaimer, the term of this patent is extended or adjusted under 35 U.S.C. 154(b) by 21 days.

This patent is subject to a terminal disclaimer.

(21) Appl. No.: 11/758,473

(22) Filed: Jun. 5, 2007

(65) Prior Publication Data

US 2007/0284404 A1    Dec. 13, 2007

Related U.S. Application Data

(63) Continuation of application No. 10/839,601, filed on May 4, 2004, now Pat. No. 7,270,255, which is a continuation of application No. 09/902,510, filed on Jul. 9, 2001, now Pat. No. 6,729,518, and a continuation-in-part of application No. 29/137,521, filed on Feb. 21, 2001, now Pat. No. Des. 453,417.

(60) Provisional application No. 60/216,977, filed on Jul. 7, 2000, provisional application No. 60/241,631, filed on Oct. 19, 2000.

(51) Int. Cl.
*A45F 4/00* (2006.01)
*A45C 1/04* (2006.01)
*A45F 5/02* (2006.01)
*A45F 5/00* (2006.01)

(52) U.S. Cl. ............ 224/675; 224/577; 224/674; 224/236; 224/191

(58) Field of Classification Search ........... 224/577, 224/578, 191, 194, 647, 270, 237, 904, 563, 224/236, 583, 199, 675, 674
See application file for complete search history.

(56) References Cited

U.S. PATENT DOCUMENTS 1,648,565 A * 11/1927 Primley ............ 206/315.9
2,426,484 A    8/1947 Buffenbarger (Continued)

FOREIGN PATENT DOCUMENTS

EP    GB2316300 A * 8/1996

(Continued)

OTHER PUBLICATIONS

Arbitration Demand Statement, Aug. 2006, 6 pages.

(Continued)

*Primary Examiner*—Nathan J Newhouse
*Assistant Examiner*—Lester L Vanterpool
(74) *Attorney, Agent, or Firm*—Sheridan Ross P.C.

(57) ABSTRACT

This invention relates to a portable case adapted for holding handheld devices such as phones, cameras, camcorders, radios and other products as well as non-electronic devices such as flashlights. The case is supported by a selectively bendable stand which may be altered in any variety of positions to provide a support for the case and associated electronic equipment. The case may also include an elastic cord element to removably interconnect the electronic device on an exterior surface of the case during use.

20 Claims, 31 Drawing Sheets

U.S. PATENT DOCUMENTS

| | | | |
|---|---|---|---|
| 2,522,322 A | 9/1950 | Wallace | |
| 2,585,209 A | 2/1952 | Abbott | |
| 3,118,580 A | 1/1964 | Manshel | |
| 3,813,017 A | 5/1974 | Pimsleur | |
| 3,949,916 A | 4/1976 | Yount | |
| 3,955,730 A * | 5/1976 | Montgomery | 224/438 |
| 4,210,186 A | 7/1980 | Belenson | |
| 4,479,596 A | 10/1984 | Swanson | |
| 4,537,313 A | 8/1985 | Workman | |
| 4,578,814 A | 3/1986 | Skamser | |
| 4,610,286 A | 9/1986 | Cyr | |
| D291,389 S | 8/1987 | Crymes | |
| D293,628 S | 1/1988 | Teachey | |
| 4,739,457 A | 4/1988 | Orr | |
| 4,802,602 A | 2/1989 | Evans et al. | |
| 4,848,624 A | 7/1989 | Clem | |
| 4,896,805 A | 1/1990 | Klaczak et al. | |
| 4,917,160 A | 4/1990 | Hart et al. | |
| 4,921,153 A | 5/1990 | Smith | |
| 4,923,105 A * | 5/1990 | Snyder | 224/255 |
| D316,186 S * | 4/1991 | Seber | D3/228 |
| 5,111,545 A | 5/1992 | Krozal | |
| 5,183,326 A | 2/1993 | Case | |
| 5,188,450 A | 2/1993 | Anderson | |
| 5,210,532 A | 5/1993 | Knoedler et al. | |
| 5,341,975 A | 8/1994 | Marinescu | |
| 5,351,868 A | 10/1994 | Beletsky et al. | |
| 5,392,974 A | 2/1995 | Johnson-Rabbett | |
| 5,511,704 A | 4/1996 | Linderer | |
| D370,776 S * | 6/1996 | Frey | D3/218 |
| D374,769 S | 10/1996 | Case | |
| D374,770 S | 10/1996 | Case | |
| 5,562,238 A | 10/1996 | White | |
| D381,805 S | 8/1997 | Case | |
| 5,687,896 A * | 11/1997 | Clift | 224/587 |
| 5,692,268 A | 12/1997 | Case | |
| 5,711,469 A | 1/1998 | Gormley et al. | |
| 5,718,023 A * | 2/1998 | Billish | 24/11 HC |
| 5,718,104 A | 2/1998 | Kennedy | |
| 5,857,600 A | 1/1999 | Akutsu | |
| 5,862,967 A | 1/1999 | Johnson | |
| D408,129 S | 4/1999 | Spraulding | |
| D410,773 S | 6/1999 | Case | |
| 5,921,657 A | 7/1999 | Case | |
| 5,964,386 A | 10/1999 | Cote | |
| 6,099,141 A | 8/2000 | Landamia | |
| 6,182,878 B1 * | 2/2001 | Racca | 224/605 |
| 6,199,737 B1 * | 3/2001 | Ringelstetter | 224/675 |
| 6,206,542 B1 | 3/2001 | Case et al. | |
| 6,209,769 B1 | 4/2001 | Seals et al. | |
| D448,162 S * | 9/2001 | Snider | D3/228 |
| 6,283,351 B1 | 9/2001 | Brite | |
| 6,328,146 B1 * | 12/2001 | Siwak | 190/109 |
| 6,343,728 B1 | 2/2002 | Carbone | |
| 6,357,646 B1 | 3/2002 | Gur et al. | |
| D455,256 S | 4/2002 | Tyler | |
| 6,367,672 B1 | 4/2002 | Lind | |
| 6,375,057 B1 | 4/2002 | Gorchian | |
| D457,723 S | 5/2002 | Tyler | |
| 6,412,674 B1 | 7/2002 | Lipke | |
| 6,478,205 B1 | 11/2002 | Fujihashi | |
| 6,568,576 B1 | 5/2003 | Godshaw et al. | |
| 6,612,432 B2 | 9/2003 | Motson | |
| 6,691,906 B2 | 2/2004 | Cragg | |
| 6,729,518 B2 | 5/2004 | Badillo et al. | |
| 6,823,566 B2 | 11/2004 | Coffey | |
| D508,607 S | 8/2005 | Balchunas et al. | |
| 2004/0206796 A1 | 10/2004 | Badillo et al. | |

FOREIGN PATENT DOCUMENTS

| | | | |
|---|---|---|---|
| GB | 2316300 | | 2/1998 |
| GB | 2332854 | | 7/1999 |
| JP | 09154618 | * | 6/1997 |
| JP | 10117830 | | 5/1998 |
| WO | 9935932 | | 7/1999 |

OTHER PUBLICATIONS

Respondent's Answering Statement and Request for Attorney's Fees and Costs, Aug. 2006, 20 pages.
Lowepro Rezo 40 camera case, www.lowepro.com, Believed to be advertised on the website after Feb. 2004, 2 pages of digital photographs.
Office Actions of parent U.S. Appl. No. 10/839,601, 67 pages.
Three photographic views of cellular phone holder by McGuire-Nicholas.
Skymall.Com Web Page.
Arbitration Interim Award, Oct. 2007, 22 pages.
Arbitration Final Award, Jan. 2008, 2 pages.
Claimant Intelligent Designs 2000 Corp.'s Position Statement and Core Exhibits, Jul. 2007, 54 pages.
Claimant Intelligent Designs 2000 Corp.'s Post-Trial Brief, Aug. 2007, 10 pages.
Nite Ize, Inc.'s Closing Brief, Aug. 2007, 12 pages.
Nite Ize, Inc.'s Brief Pursuant to Order of Dec. 20, 2007 Phone Hearing, Jan. 2008, 12 pages.
Respondent's Reply Brief to Claimant's Opposition to Respondents Summary Judgment Motion on Breach of Contract Claim Jul. 2007, 9 pages.
Claimant Intelligent Designs 2000 Corp.'s Specification of Claims, Jun. 2007, 43 pages.
Declaration of Paul Badillo in Support of Claimant Intelligent Designs 2000 Corp.'s Opposition to Nite-lze, Inc. 9 Motions for Summary Judgment, Jun. 2007, 21 pages.
Expert Opinion of Jack Makovsky for Intelligent Designs 2000 Corp., May 2007, 20 pages.
Expert Report of Steven Bernstein for Nite Ize, Inc., May 2007, 24 pages.
Expert Report of Gregg I. Anderson for Nite Ize, Inc., May 2007, 32 pages.
Respondent's Dispositive Motion and Brief in Support of Motion on Claimant's Claim Under the Patent License Agreement, Jun. 2007, 18 pages.
Respondent's Sur Reply to Motion to Dismiss, Nov. 2006, 35 pages.
Intelligent Designs Specification of Contract Claim, Dec. 2006, 9 pages.
Respondent's Motion to Dismiss, Sep. 2006, 14 pages.
Arbitration Demand Statement, Aug. 2006, 181 pages.

* cited by examiner

CARRYING CASE WITH SELECTIVELY ADJUSTABLE STAND

This application is a Continuation of U.S. patent application Ser. No. 10/839,601, filed May 4, 2004, which is a Continuation of U.S. patent application Ser. No. 09/902,510, now U.S. Pat. No. 6,729,518, filed Jul. 9, 2001, which claims the benefit of U.S. Provisional Patent Applications Ser. Nos. 60/216,977 and 60/241,631, filed Jul. 7, 2000 and Oct. 19, 2000, respectively, and is a Continuation-in-Part of U.S. Design Pat. No. 29/137,521, now U.S. Design Pat. D453,417, filed Feb. 21, 2001, each application or issued patent incorporated by reference in their entirety herein.

FIELD OF THE INVENTION

The present invention relates to carrying cases for handheld apparatus and more specifically to carrying cases having an interconnected selectively adjustable and reversible stand to provide an apparatus for supporting or hanging the carrying case in a plurality of positions.

BACKGROUND OF THE INVENTION

Handheld cases are used for any variety and number of purposes to protect electronic devices such as cameras, camcorders and other products from exposure to weather and other elements. These cases are also used to hold products such as flashlights, cell phones, global positioning systems (GPS), personal digital assistants (PDA's) portable radios and other similar handheld devices (herein collectively "electronic device") These handheld cases are typically made of leather, nylon, or other fabrics which are resistant to wear yet provide protection from the elements. Certain cases also have the additional feature of providing a belt strap or other interconnection mechanism to attach the case to a user's belt or clothing. This feature prevents the case and associated electronic device from being inadvertently lost or stolen, yet allowing a user to have their hands free for other uses. One example of this type of case is a cell phone case manufactured and sold by McGuire-Nicholas which comprises a sheath or holster designed to receive the phone, and which is interconnected to a short, rigid metallic clip extending from the back of the sheath. Although the clip can be used on a belt, the carrying apparatus and enclosed electronic device cannot be supported in a stable upright position on a flat object such as a desk top. Further, the metallic clip is incapable of being reversibly bent to either support or hang the carrying case in any number of positions.

Another type of holder especially designed for a flashlight is disclosed in U.S. Pat. No. 6,206,542 for a "Flashlight Support Device". This device allows a flashlight to be positioned in one of numerous different positions with four independently operated legs, yet is incapable of holding and securing other electronic devices within the rigid plastic sleeve. Further, the lower end of the plastic sleeve does not independently provide a stable base to secure an apparatus in a stable, upright position, nor provide a means for securing an electronic device to an exterior surface of the sleeve.

Thus, none of the existing prior art storage cases provide a means for supporting or hanging an electronic device in a preferred position of use, while otherwise allowing the electronic device to be stored in a secure position adjacent a user's body. For example, to access the key pad on a cellular phone or PDA, it is preferable to have the device supported in a secure upright position. A further problem exists with flashlights which can be utilized in a number of different ways if the beam of light can be oriented in a preferred direction. For example, when a user needs both hands to operate tools or other machinery, it is preferable to have some type of case which can be used to support or hang the flashlight, yet can also be secured adjacent a user's body during transportation.

Thus, a need exists for a carrying case which has a selectively adjustable support stand which allows the case to be oriented and positioned in a firm upright position or hung from an object to orient an electronic device in a preferred position of use. Additionally, a need exists for the support stand to be reversibly bendable in such a degree that it can be alternatively used as a belt clip or a support device with a plurality of positions of use.

SUMMARY OF THE INVENTION

It is thus one aspect of the present invention to provide a portable carrying case for an electronic apparatus with a built-in selectively adjustable stand which can be either supported on an object such as a table top or hung from an object. As previously stated, these electronic apparatus may include but are not limited to cellular telephones, personal digital assistants (PDA's), radios, global positioning systems, (GPS), cameras, flashlights and other similar devices. The invention is designed to provide a reversibly bendable support member interconnected to a sheath or holster such that the apparatus and/or the case can be used in a multiplicity of applications. For example, the carrying case in one embodiment is designed to hold a cellular telephone. The selectively adjustable stand can be used to position the cellular phone in an upright position on a table or desk top for hands free operation. Further, the device can be used to hang the phone from an object such as a rear view mirror or cup-holder in an automobile. The selectively adjustable stand may also be used as a belt clip for securing the case to one's belt or another article of clothing when not in use. Further, the case may be secured on a belt and tilted in a preferred orientation of use while removably interconnected to a user's belt or pocket.

In one aspect of the present invention, a removably bendable support stand is provided which may be bent in at least two distinct directions to allow the carrying case to either be supported on or hung from an object. In one embodiment of the present invention a bendable metallic material is provided for the support stand which is preferably covered with a fabric, plastic, rubber or other material.

It is another aspect of the present invention to provide a means for supporting the electronic apparatus on the exterior of the carrying case to allow use while exposing keypads, buttons, speakers and other gadgetry associated with the electronic device. In one embodiment of the present invention, an elastic cord is interconnected on a front surface of the sheath to accommodate this feature. Alternatively, mesh fabric materials, hook and loop straps or other types of similar devices may be used for the same purpose.

It is another aspect of the present invention to provide a carrying case with a reflective flap cover, wherein the interior surface of the flap has a reflective lining. This reflective lining may be chosen from metal foils or any other reflective fabrics to reflect a light source in a preferred direction. The reflective inner lining is preferably used in conjunction with a flashlight to deflect light similar to a lantern. Thus, the flashlight/carrying case may be adjusted using the selectively adjustable stand to deflect light off the flap inner lining to disburse the light over a greater area than a typical flashlight.

It is yet a further aspect of the present invention to provide one or more sleeves interconnected to the case for storing batteries or other auxiliary devices. The sleeves are generally created by an elastic band sewn or otherwise attached to the carrying case body. The elastic sleeves are typically sized for the batteries commonly used in the device for which the carrying case is designed to carry, although other types of accessory items commonly used with the electronic apparatus can also be conveniently stored on the case.

It is yet another aspect of the present invention to provide a secondary elastic band or other similar apparatus which is interconnected to the support stand, sheath, or both and which enables the carrying case to be attached to a secondary object. In the example of the flashlight carrying case, this feature enables a user to create an adjustable headband for holding the carrying case and associated flashlight on a user's head.

It is a further aspect of the present invention that the support member and associated sheath and backing plate have sufficient rigidity to provide at least three distinct points of support, i.e. from a minimum of two corners on the sheath back support and one on the selectively adjustable support member. Preferably, at least four distinct points of support are provided, i.e., two from the corners of the sheath back support and two from the corners of the adjustable support stand corners to provide a stable, secure stand that will not easily tip over during use. Alternatively, in one embodiment of the present invention a support member with two distinct legs is provided which works in operable combination to support or suspend the carrying case and electronic apparatus.

It is a further aspect of the present invention to provide a sheath and/or support member with a skid-resistant material such as rubber or soft plastic which in use is in direct contact with a table top or other planer object to impede slipping. Thus, in one embodiment of the present invention a rubber material is positioned along a lower edge of the support member, or sheath back support.

It is another aspect of the present invention to provide a removable support stand in combination with a carrying case for use with cameras and other similar devices wherein the selectively adjustable stand may be used as a tripod for a camera for which the case is designed. More specifically, the camera case can be selectively adjusted to support a camera, camcorder or other similar hand-held object in a stable, preferred position wherein a remote control or timing device can be used to operate the camera in a "hands-off" mode. When not in use, the selectively adjustable support stand can be removed and stored in a sleeve, pocket, or other similar storage area integral to the case.

It is yet another aspect of the present invention to provide a flexible sheath made of a sewn and stitched material with a rigid backing sheet to provide sufficient support for the apparatus while positioned upright on a planar object such as a table or desk top. As opposed to rigid plastic cases, the sewn and stitched type sheath provides flexibility for different sized electronic devices, and is cost effective to manufacture.

In one embodiment of the present invention, a one-piece bendable, metallic support member is provided, and which extends along substantially the entire rear portion of the sheath. Preferably, the one-piece bendable metallic support stand has a sufficient length to comprise both a back support for the sheath and the selectively adjustable support member, and being bendable in a position substantially midway between a first end and a second end. Alternatively, dual support legs which operate in substantial unison may be provided with the sheath to provide a case with sufficient support to be oriented in an upright position.

It is a further aspect of the present invention that the support member include a snap, button or other similar securement device which allows the support member to be removably interconnected to the sheath to allow the carrying case to be secured to a belt or other object. Preferably, the device may be secured with the use of one hand, such as with a snap on hook and loop material.

Thus, in one aspect of the present invention, a case adapted for protecting an apparatus and providing a selectively adjustable support stand is provided, which comprises:

a case body comprising a back support and a sheath for defining an interior space to receive the apparatus, said sheath comprising an upper end, a lower end and opposing lateral edges positioned therebetween;

a support member having a free end, a connecting end and opposing lateral edges positioned therebetween, said support member being reversibly bendable along substantially an entire length and interconnected on said connecting end to said sheath, wherein said support member can be maintained closely adjacent to said sheath or selectively bent to either support or hang said carrying case in a plurality of positions.

DETAILED DESCRIPTION OF THE PREFERRED EMBODIMENT

Figure 1:
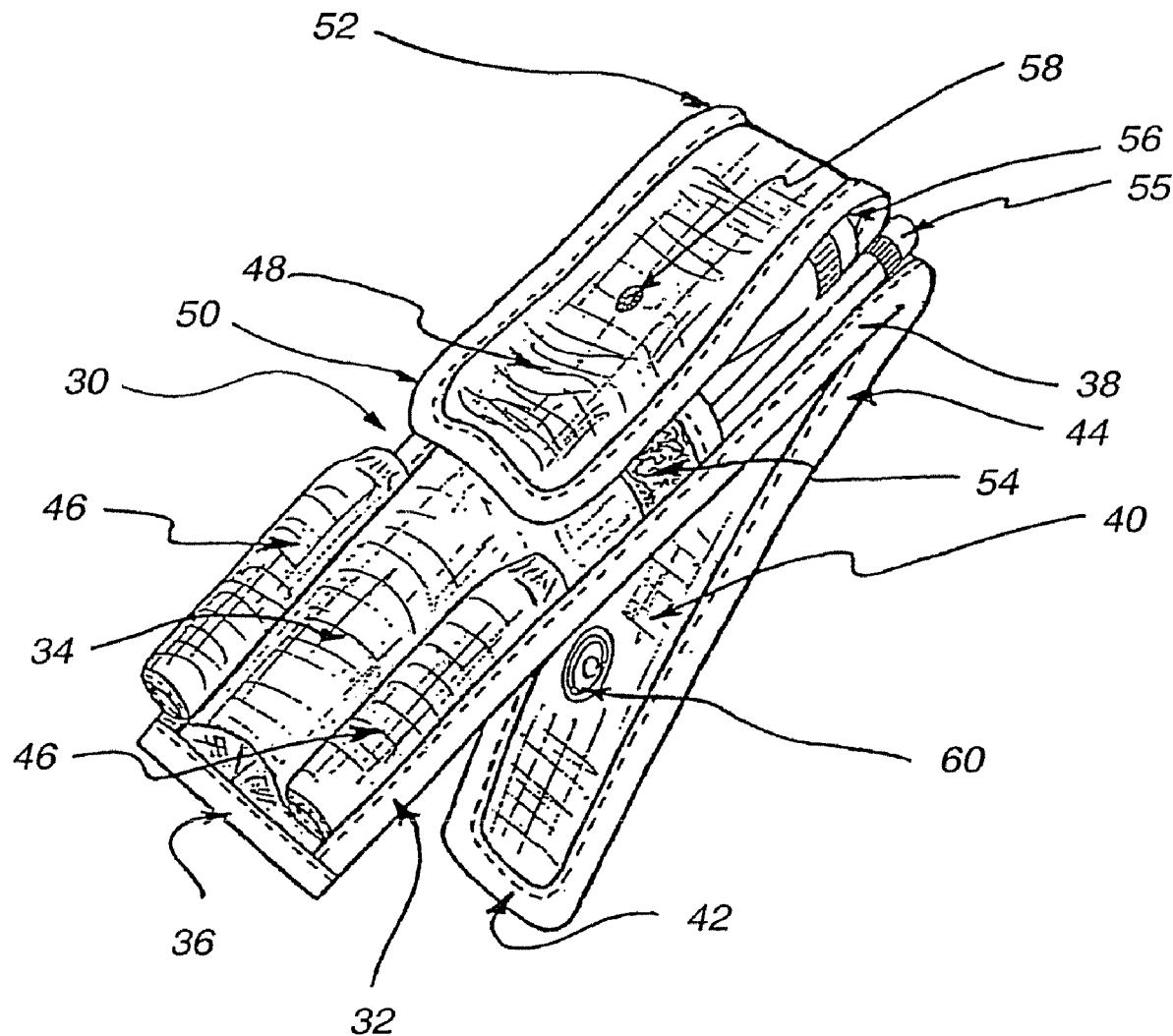
FIG. 1 is a front perspective view of one embodiment of the present invention.

Referring now to the drawings, FIG. 1 shows one embodiment of the present invention. In general, the invention comprises a case body 30 with a back support 32 and a sheath 34 interconnected to the back support 32. The back support 32 typically has a lower end 36 and an upper end 38 which provides rigidity and support to the sheath 34. Alternatively, a sheath 34 may be provided without the back support 32. One distinct and novel feature of the present invention is the selectively adjustable support member 40, which generally has a free end 42 and a connection end 44. The adjustable support member 40 is interconnected to an upper portion of the back support 38 in a manner which allows the support member to be rotated about a point of interconnection with an upper portion of the back-support 38 or sheath 34.

The adjustable support member 40 is bendable and positionable so as to allow selective adjustment and orientation of the carrying case to a desired position of use or storage. Preferably, the adjustable support member 40 is hingedly interconnected to the back support upper end 38. More preferably, the adjustable support member 40 is bendable in at least a first direction and a second direction, and has the ability to repeatedly be bent and configured in a plurality of positions without damaging the bendable material associated with the adjustable support member 40. It is also preferred that the adjustable support member 40 be flexible enough to be repositioned to another desired position or to its original position, i.e., reversibly bendable. Additionally, it is preferable that the adjustable support member 40 be reversibly bendable along at least substantially its entire length.

In a preferred embodiment, the adjustable support member 40 has a sufficient length to extend substantially along an entire length of the sheath 34, and thus serves the dual role of being both a back support 32 and a selectively adjustable support member 40. In one embodiment, the selectively adjustable support member 40 is used in conjunction with a sewn and stitched, durable fabric material which provides some flexibility to hold different types of apparatus in the same case in a cost effective manner. To enhance the flexibility, the sheath 34 may be constructed with elastic panels which interconnect the back support 32 to a front panel of the sheath 34. Further, in some embodiments which store electronic devices, it is preferable to have some form of aperture or opening on a lower end of the sheath 34 to allow the removable interconnection of attachment devices such as headphones, etc.

Thus, as seen in FIGS. 5-8, the adjustable support member 40 may be bent to either provide a support for a substantially flat object such as a desk top, or be used to hang the case and associated electronic apparatus from an object such as a vehicle rear view mirror or other object.

Also shown in FIG. 1 is a plurality of storage sleeves 46. In this embodiment two storage sleeves 46 are attached to the sheath 34. Each storage sleeve 46 is essentially a piece of elastic fabric folded to form a tube and sewn to or otherwise attached to the case body 30. The embodiment of FIG. 1 further includes a sheath cover 48 for securing the apparatus within the case body 30.

In the embodiment shown in FIG. 1, the sheath cover 48 has a flap end 50 and a secured end 52. The secured end 52 is attached to the back support head end 38 and can be selectively secured to the case body 30 by cover securement means 54. The cover securement means 54 may be hook and loop closure, snap, button or other equivalent device for selective securement. Alternatively, the sheath cover 48 may be sized to accommodate selective insertion and removal of a writing instrument 55, such as a pencil, into the sheath 34 beside the carrying case's intended electronic device without displacement of the sheath cover.

Figure 2:
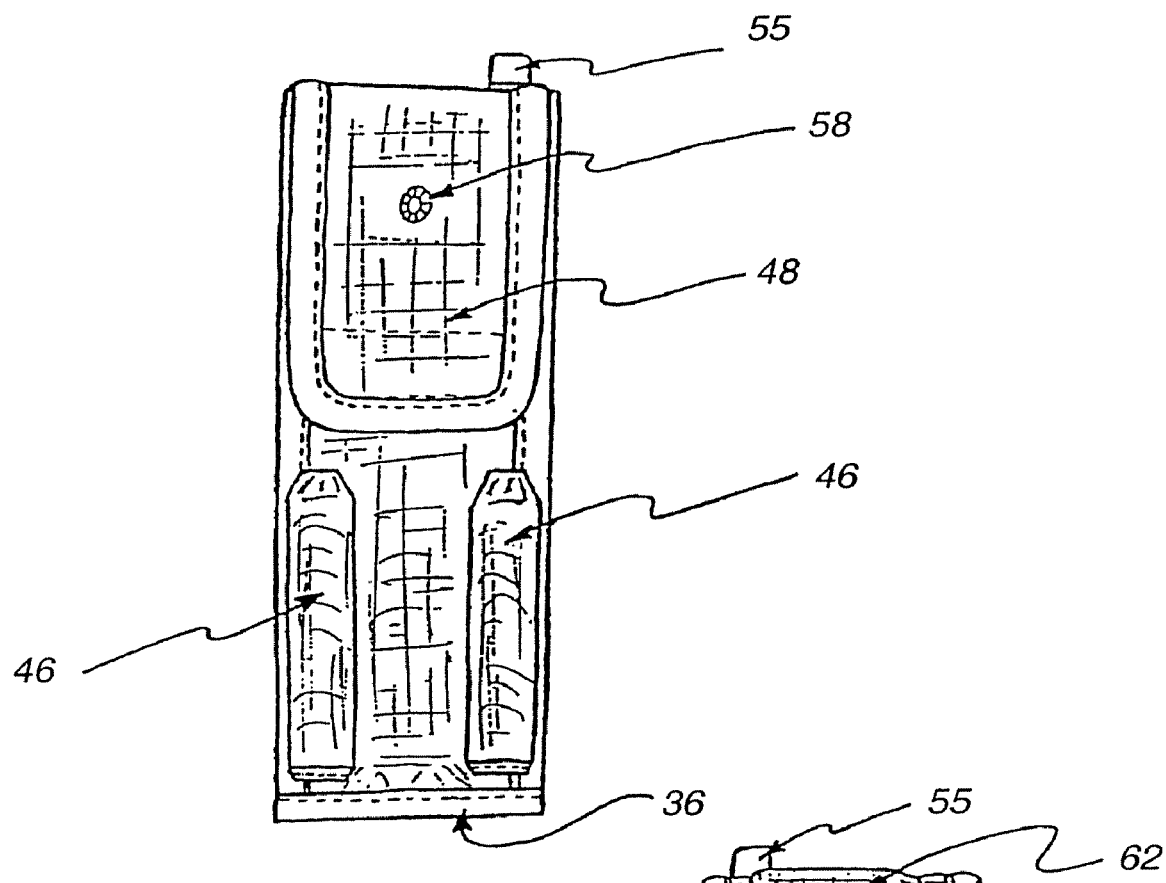
FIG. 2 is a front elevation view of the embodiment shown in FIG. 1.
Figure 3:
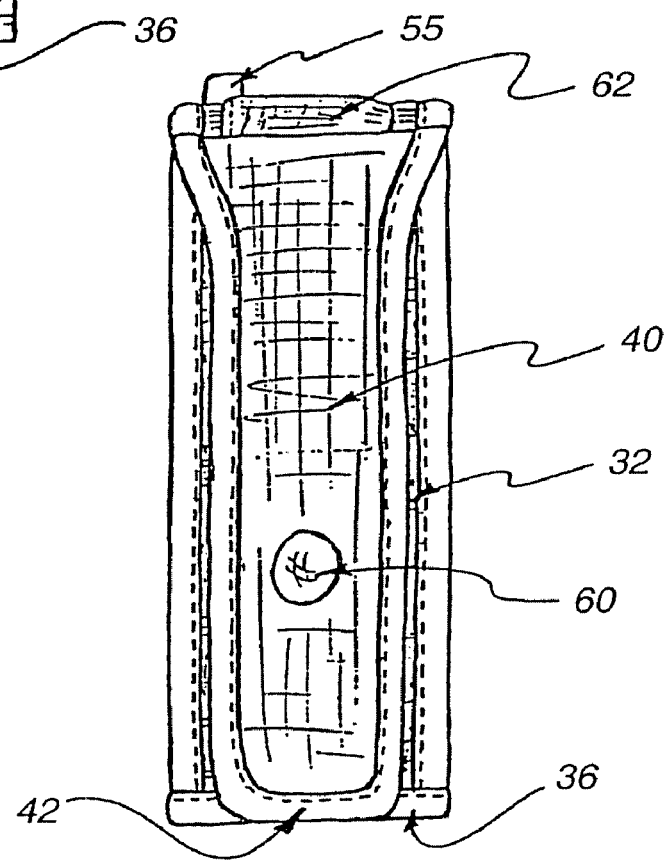
FIG. 3 is the rear elevation view of the embodiment shown in FIG. 1.
Figure 4:
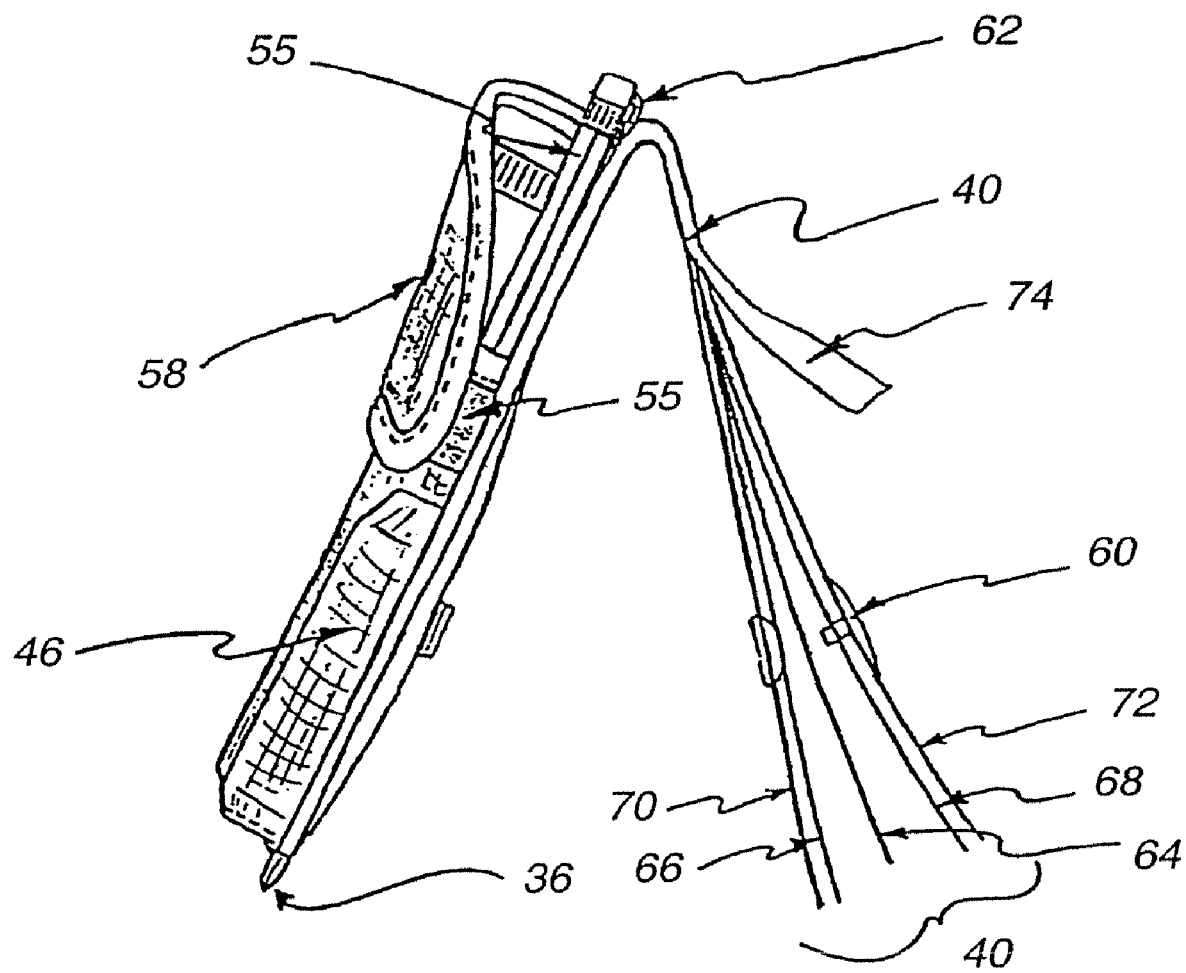
FIG. 4 is a right elevation view of the embodiment shown in FIG. 1.
Figure 5:
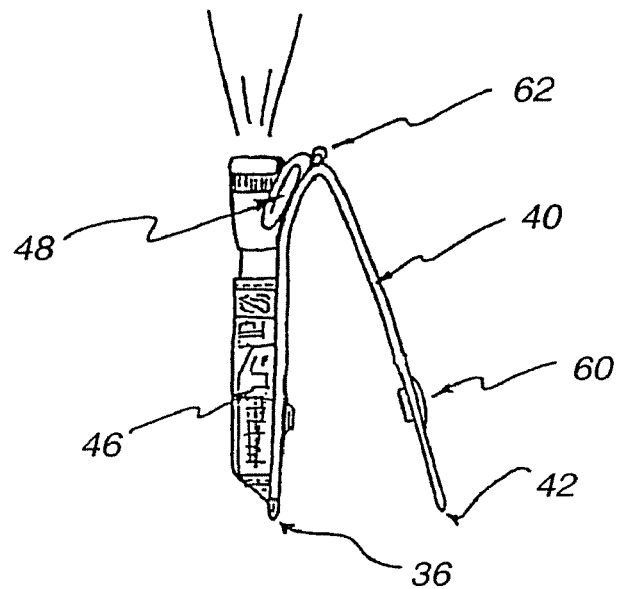
FIG. 5 is a right elevation view of the embodiment depicted in FIG. 1 with a flashlight held in a vertical position of use.
Figure 6:
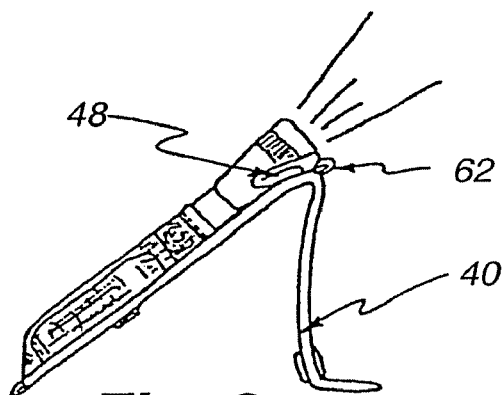
FIG. 6 is a right elevation view of the embodiment of FIG. 1, wherein a flashlight is held in an angled position.

FIGS. 2-4 represent the front elevation, rear elevation and right elevation views of the embodiment of FIG. 1. FIG. 4 is a partially exploded view which provides more detail regarding the adjustable support member 40 and the construction thereof. FIG. 3 depicts the selectively adjustable support member 40 with an interconnection mechanism 60 for securing the adjustable support member 40 to the back support 32. This interconnection mechanism 60 may be any securement means such as a snap, hook and loop closure, such as VEL-CRO®, or other equivalent device that allows the adjustable support to be maintained in a proximal relation to the case to minimize the area required to store the case 30. More specifically, the snap or other similar device is typically used to secure the adjustable support member 40 and associated case body 30 to a user's belt or other similar device.

FIG. 3 also depicts a flashlight bulb holder 62. The bulb holder 62 is typically fabricated in the same manner as the other storage sleeves 46. However, in this embodiment the bulb holder 62 is attached horizontally between the seam of the sheath cover secured end 52 and the back support head end 38. The bulb holder may be used, among other things, to store a replacement bulb for a flashlight for which the carrying case is designed.

FIG. 4 depicts a right elevation view of the embodiment of the present invention shown in FIG. 1. FIG. 4 shows in a partially exploded view and one possible method of forming the selectively adjustable support member 40. In this view, the bendable support member 40 is housed within one side by the inner support lining 66 and the inner fabric cover 70 and on the other side by the outer support lining 68 and the outer fabric covering 72. In this way, the bendable support member 40 may be formed from any formable material, for example sheet metal, bendable plastics and other similar materials. The support linings 66 and 68 protect the fabric coverings 70 and 72, respectively, from wear and abrasion by the bendable support member 40. In one embodiment, the fabric coverings 70 and 72 are secured together by a support edge covering 74. Thus, the fabric coverings 70 and 72, plastic linings 66 and 68, and bendable support member 40 are all protected along the edges. The support edge covering 74 also provides a method of securement by stitching, adhesive or other similar method.

With regard to the physical shape and characteristics of the selectively adjustable support member 40, any number of configurations could be used for the same purpose of providing a selectively adjustable support which can be reversibly and repeatedly bent in a plurality of positions. More specifically, the support member 40 may have a generally rectangular, square, or triangular shape, or may be comprised of two legs (as opposed to one) working in operable combination to provide a stable support mechanism capable of supporting or hanging the sheath 34. Further, in one embodiment of the present application it is anticipated that the adjustable support member be biased to extend outwardly when pressure is applied to a lower portion of the sheath 30, back support lower end 36, or a lower portion of the support member 40. Thus, the selectively adjustable support member 40 can be automatically extended upon setting the case body 30 on a surface (not shown). Further, anti-skid materials such as rubber may be placed on a lower portion of the adjustable support member 40, lower portion of the back support 32, or lower portion of the sheath 34 to inhibit the device from sliding while positioned on a table top or other similar surface.

Referring now to FIGS. 5-8, in another aspect of the present invention a reflective lining 56 is provided on an interior surface of the sheath cover 48. This reflective lining 52 causes the sheath cover 48 to deflect light when used in combination with a flashlight. The reflective material is generally comprised of a reflective surface such as aluminum foil, tin foil and other well known materials which may be sewn, stitched or otherwise interconnected to the interior flap surface. One such material is a metallic silver wolf grain laminated to an Osnaburg cloth as manufactured by Kline Processing, Inc. of Trenton, N.J.

FIG. 1 further shows an additional embodiment of the present invention used in combination with the reflective lining 52, and which includes an eyelet 58. The eyelet 58 can be used in conjunction with a flashlight in the carrying case 30 and the reflective lining 56 to create a type of signal mirror, for example, to be used to signal help. The user may look through the eyelet 58 in the direction of the light reflected by the reflective lining 56 to verify the reflection is directed as desired. The user may also line up a target person to receive a signal with the eyelet 56 and prevent unwanted persons or animals from viewing the signal.

Figure 7:
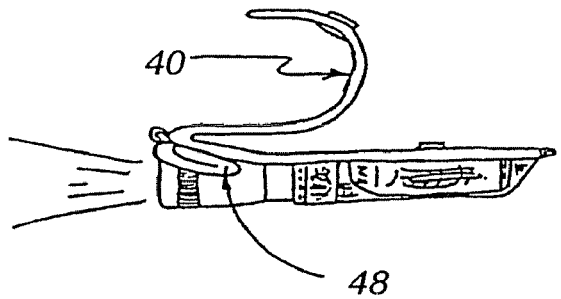
FIG. 7 is a side elevation view of the embodiment of FIG. 1, wherein the selectively adjustable stand is formed to provide a handgrip.

FIGS. 5-8 shows the present invention in use with a typical handheld flashlight. In this application the selectively adjustable support member 40 is positioned relative to the case body 30 in one of a plurality of possible positions to direct a beam of light in a preferred direction. FIG. 7 shows a side view of the alternative use of the embodiment of the present invention. In this embodiment, the adjustable support member 40 is formed so as to fit the hand of the user of the case body 30 such that the user's hand may hold the adjustable support member 40 while keeping the other hand free to hold another device such as a baton or other weapon in the use of law enforcement.

Figure 8:
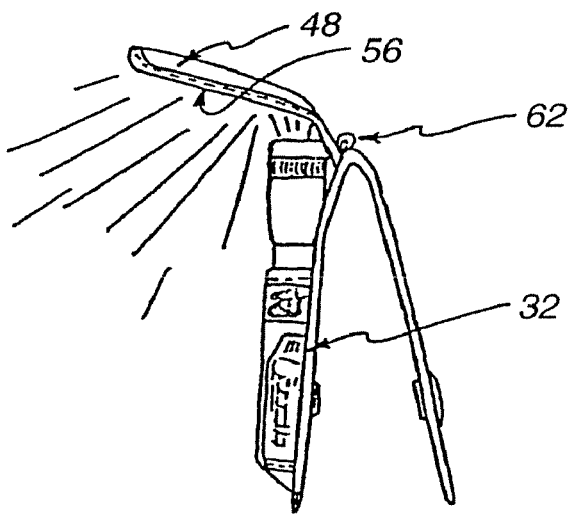
FIG. 8 is a right elevation view of the embodiment of FIG. 1, with a portion of a reflective flap used to provide a lantern.

FIG. 8 shows a side view of yet another application of the embodiment of the present invention shown in FIG. 1. In this application, the selectively adjustable support member 40 is positioned such that the case body in conjunction with a flashlight is held in a vertical position. In this configuration, the reflective lining 56 of the sheath cover 48 is placed above the flashlight such that the flashlight can be used as a lantern by disbursing and defracting light over a greater area.

Figure 9:
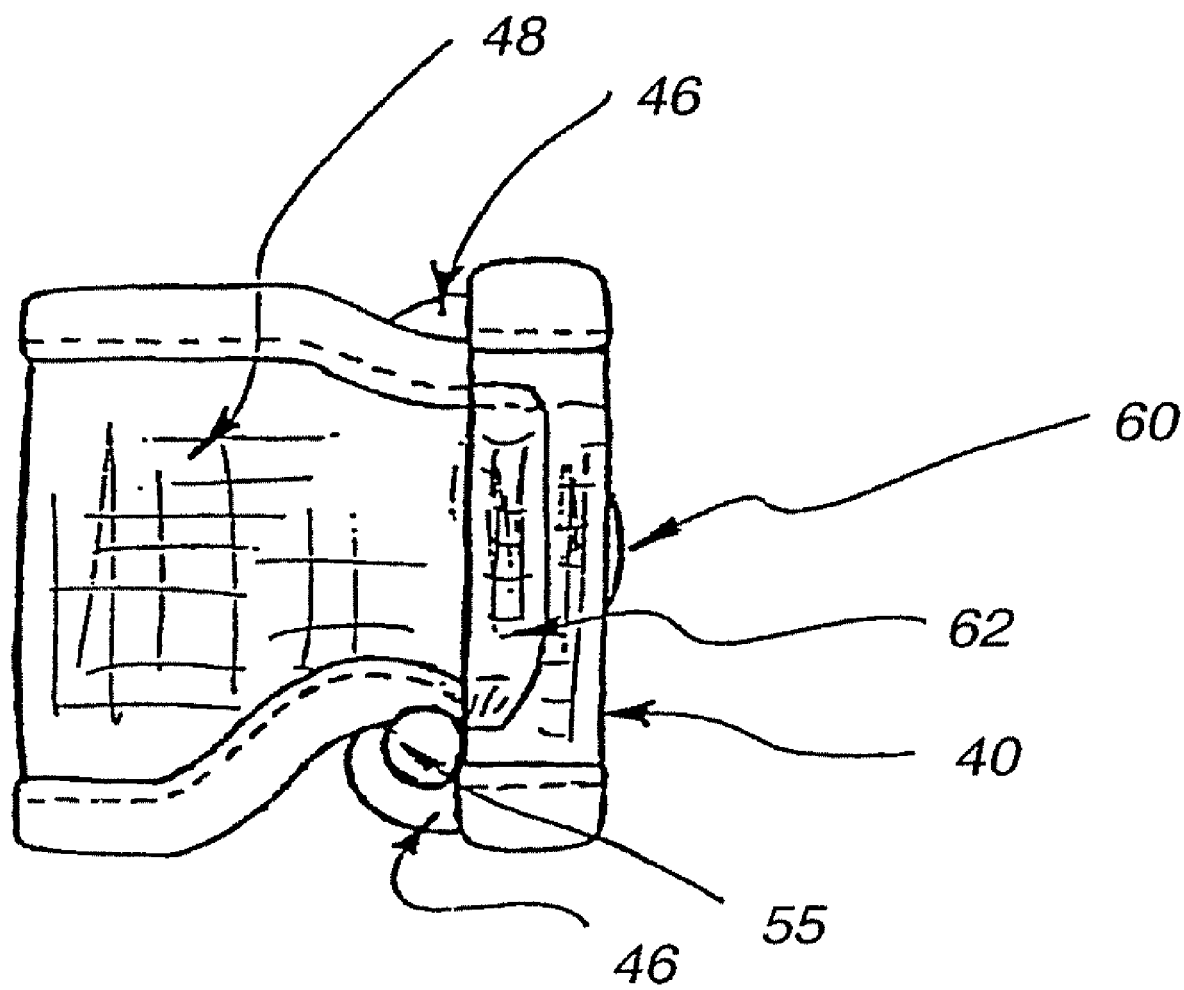
FIG. 9 is a top plan view of the embodiment shown in FIG. 1.

FIG. 9 is a top plan view of the embodiment shown in FIG. 1, and identifying in greater detail some of the features discussed above. To form some of the numerous storage sleeves 46 used in the present invention, an elastic fabric 76 is generally cut to a desired length and folded to form the storage sleeves 46 secured by a tube seam. The elastic fabric 76 has a constraining member along one of the lateral sides of the elastic fabric 76. The constraining member provides for one end of the storage sleeves 46 to remain at some desired size such that unwanted slippage of a battery or other accessory device does not occur through that respective end of the storage sleeve 46. The constraining member may be a thread, a cord, a wire, a staple or any other like material inserted in the elastic fabric 76 to limit the stretching along at least a portion of the material.

Figure 10:
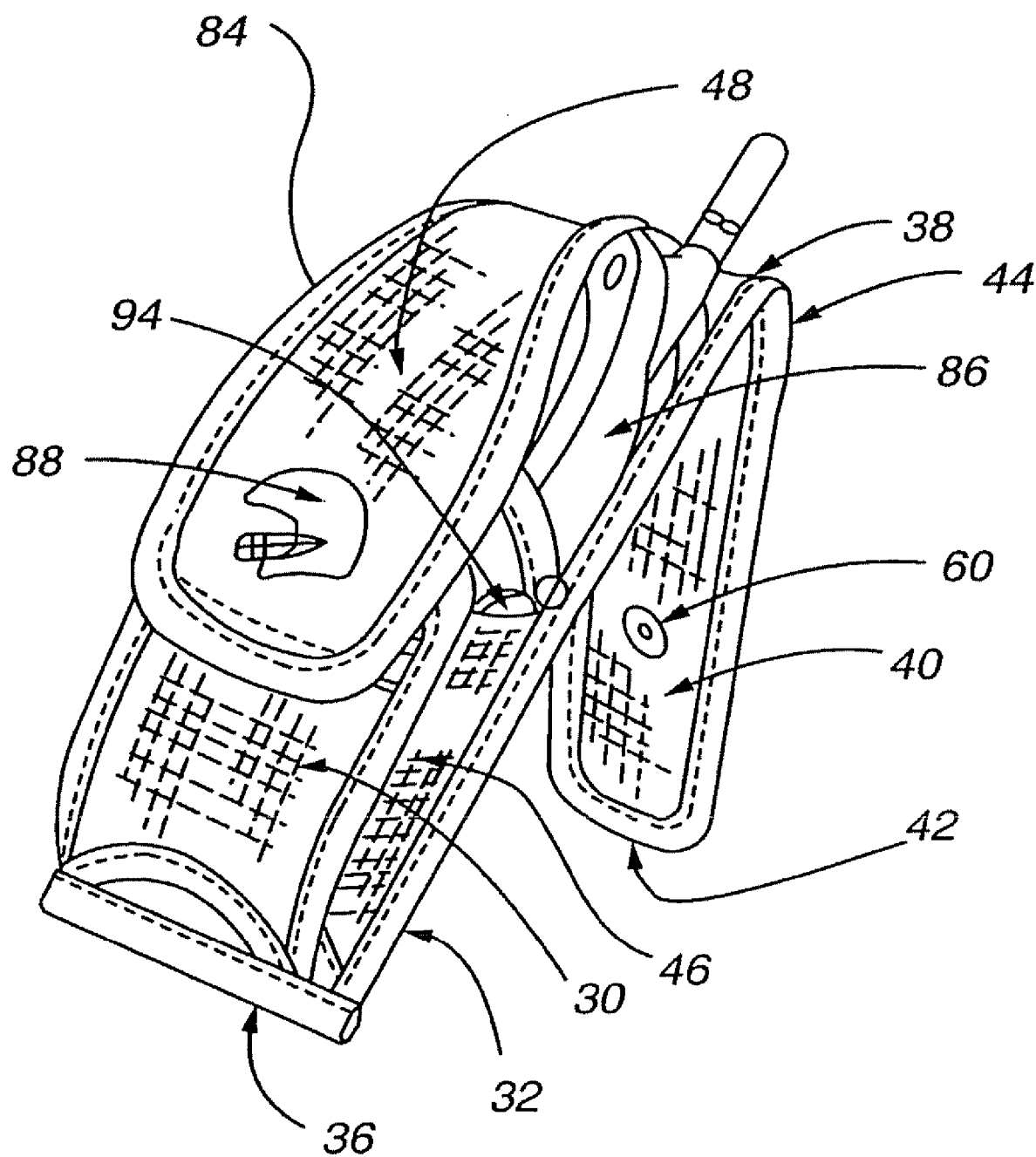
FIG. 10 is a front perspective view of an alternative embodiment of the present invention.
Figure 10A:
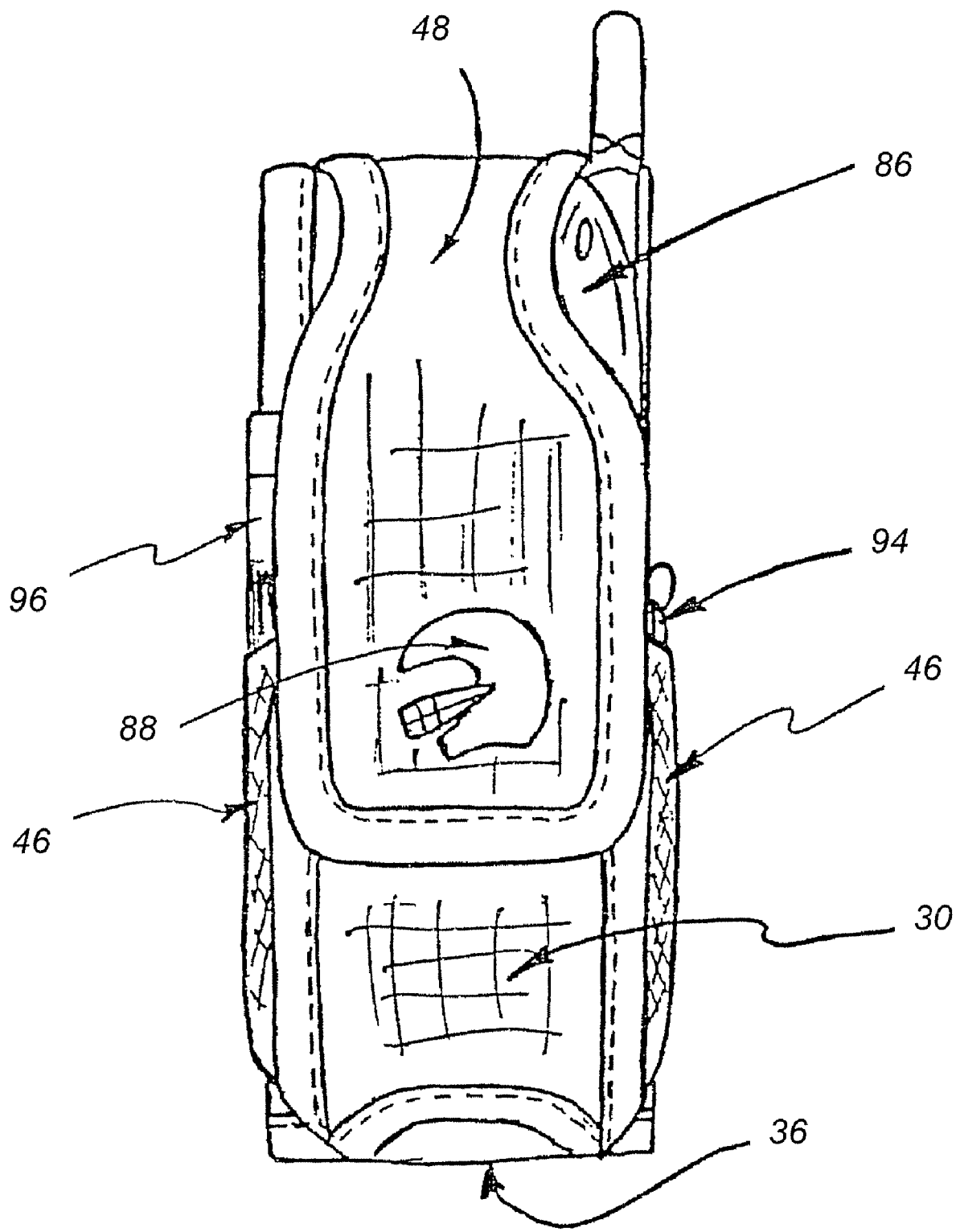
FIG. 10a is a front elevation view of the embodiment shown in FIG. 10.

FIG. 10 depicts another embodiment of the present invention wherein the case body 30 is designed to hold a cellular telephone 86. As in other embodiments of the present invention, this embodiment generally comprises a sheath 34 designed to fit a particular apparatus. The sheath 34 may be interconnected to a back support 32 with a sufficiently wide lower end 36 to provide stability and inhibit the case body 30 and enclosed electronic apparatus from inadvertently tipping. Thus, it is preferable that the case body 30 and interconnected selectively adjustable support member 40 have at least three distinct points of contact to provide a stable, non tipping base. In FIG. 10, the adjustable support member 40 has at least one distinct point of contact while the lower end of the back support 32 has a point of contact on each corner. Preferably the adjustable support member 40 is wide enough to provide two distinct points of contact, i.e., one on each corner.

Figure 11:
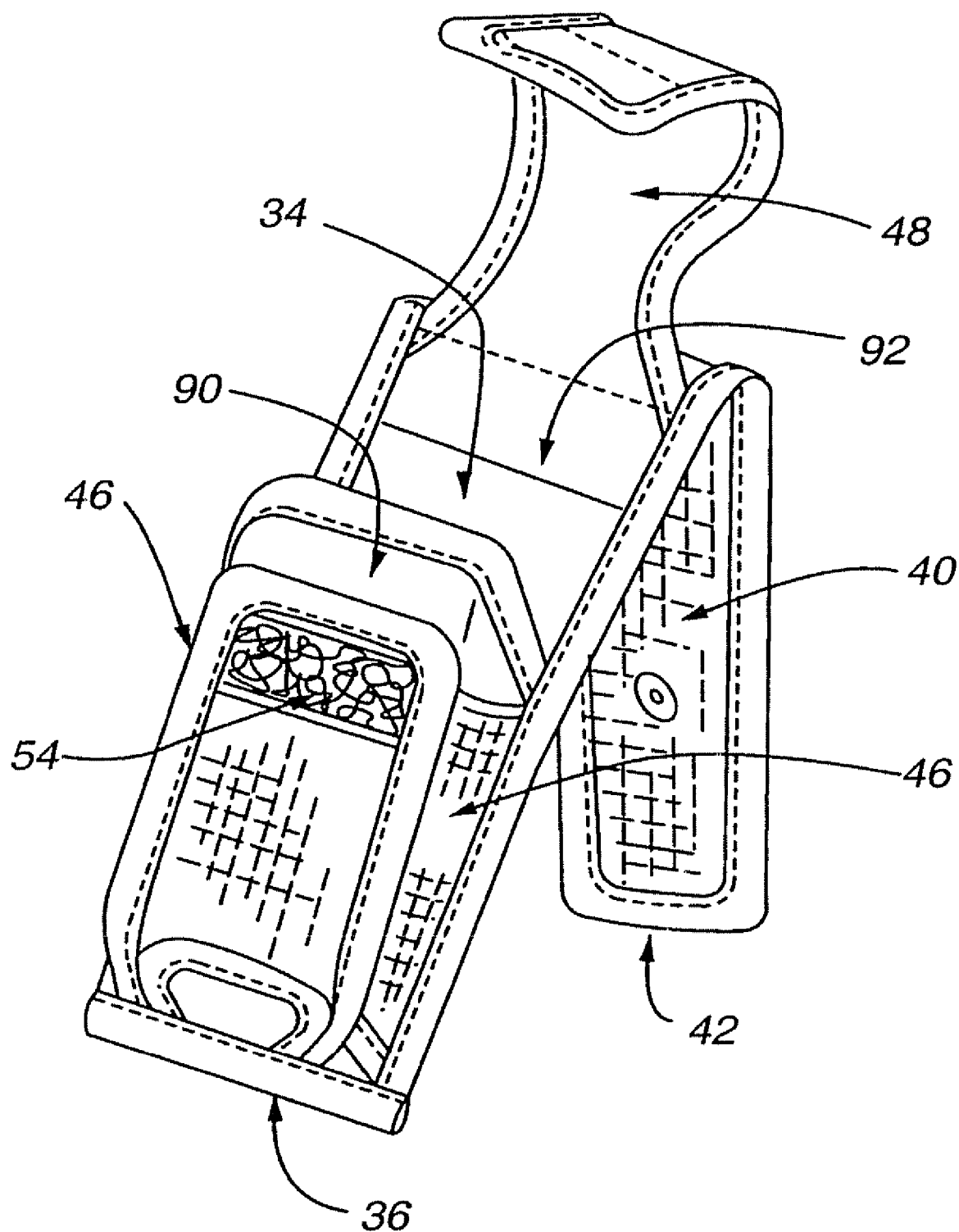
FIG. 11 is a front perspective view of the embodiment of FIG. 10 shown with a flap extended upwardly to identify various pockets.

FIG. 10 shows an alternative embodiment of the present invention whereby the sheath cover 48 may include a logo 88 or other distinctive design to allow the user to show support for a company, corporation or particular sports team. FIG. 11 shows the embodiment of the present invention as in FIG. 10 without the cellular phone in the sheath 34. In this view it is possible to see alternative embodiments of the invention such as a business card pocket 90 formed on the outside of the sheath 34, and a money pocket 92 formed between the sheath 34 and the back support 32. These alternative embodiments allow the user to employ the case for additional purposes beyond merely storing a cellular telephone. The money pocket 92 and the business card pocket 90 may be used in applications other than what their names would imply. For example, the business card pocket 90 could easily store a thin calculator. Similarly, the money pocket 92 could be just as easily house credit cards, or similar items. As FIG. 11 shows, the case may suffice as an all purpose wallet or purse such that the user need not carry any additional personal items.

Figure 12:
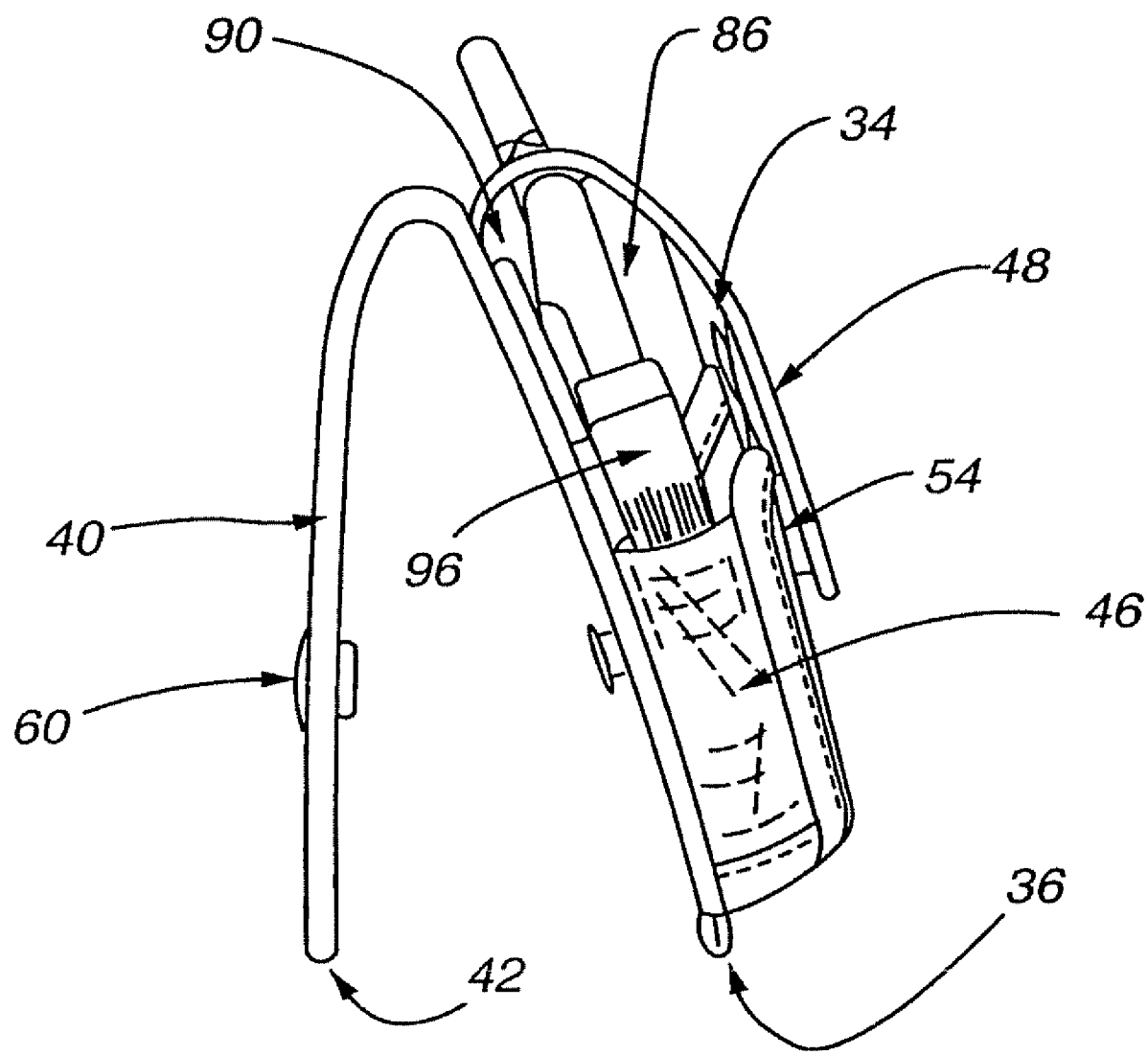
FIG. 12 is a left elevation view of FIG. 10.

FIG. 12 is a left elevation view of the embodiment invention shown in FIG. 11 with the sheath cover 48 in a closed position and containing a cellular telephone. FIG. 11 further shows how a flashlight 96 or other electronic device may be stored in a desired location in one of the storage sleeves 46 immediately adjacent the cellular telephone.

Figure 13:
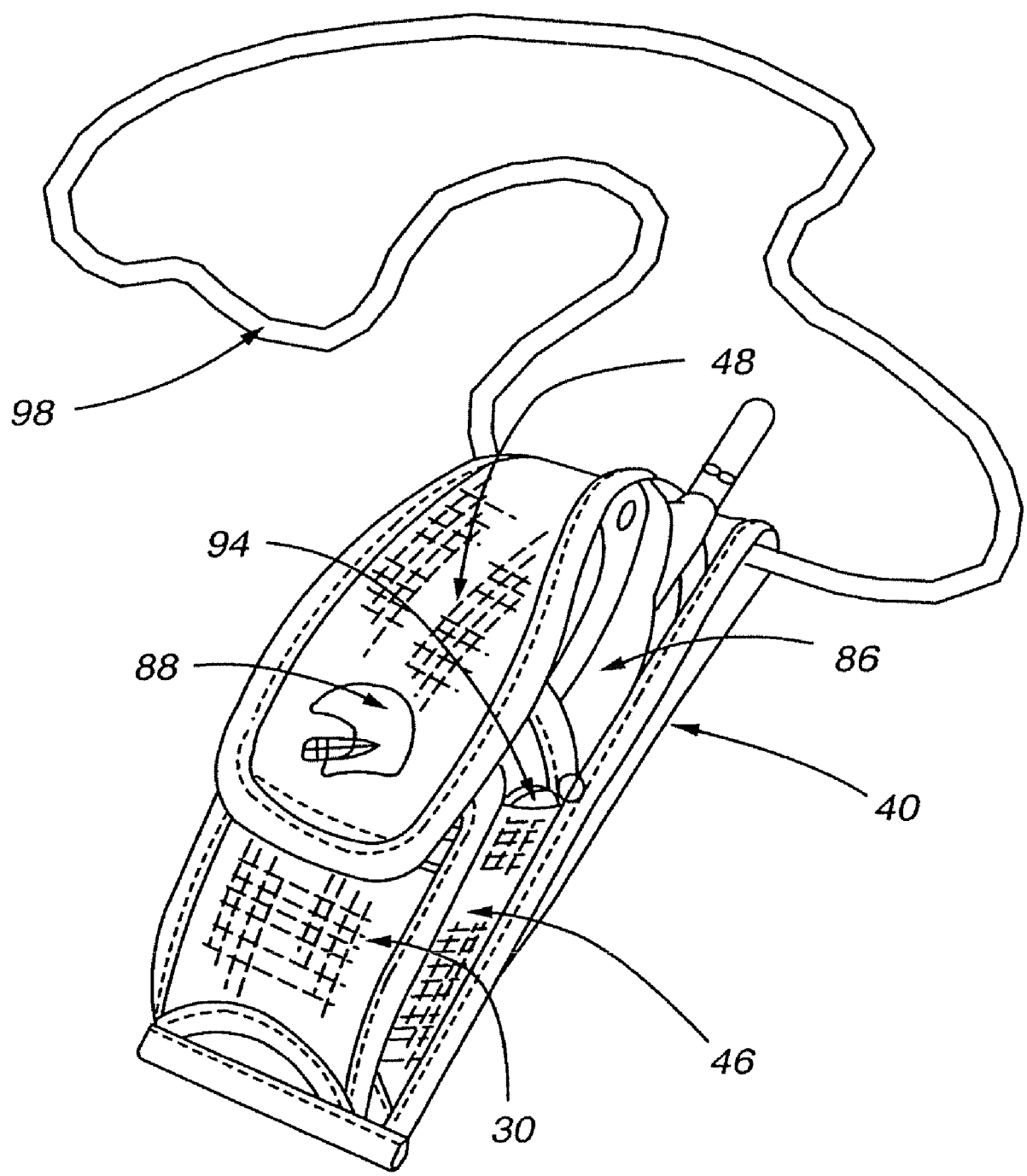
FIG. 13 is a front perspective view of the embodiment of FIG. 10 with an incorporated shoulder strap.

FIG. 13 depicts an alternative embodiment of the present invention shown in FIG. 12, wherein a shoulder strap 98 is secured between the adjustable support member 40 and the back support 32 by the interconnection mechanism 60. In this way, the case 30 may be carried with the shoulder strap 98 over the user's shoulder, much like a purse. Alternatively, the strap could be wrapped around an object to secure the case 30 in a desired position. In one embodiment the shoulder strap may comprise an elastic cord or other similar type of stretchable material. Alternatively, non-stretching materials such as leather may be used.

Figure 14:
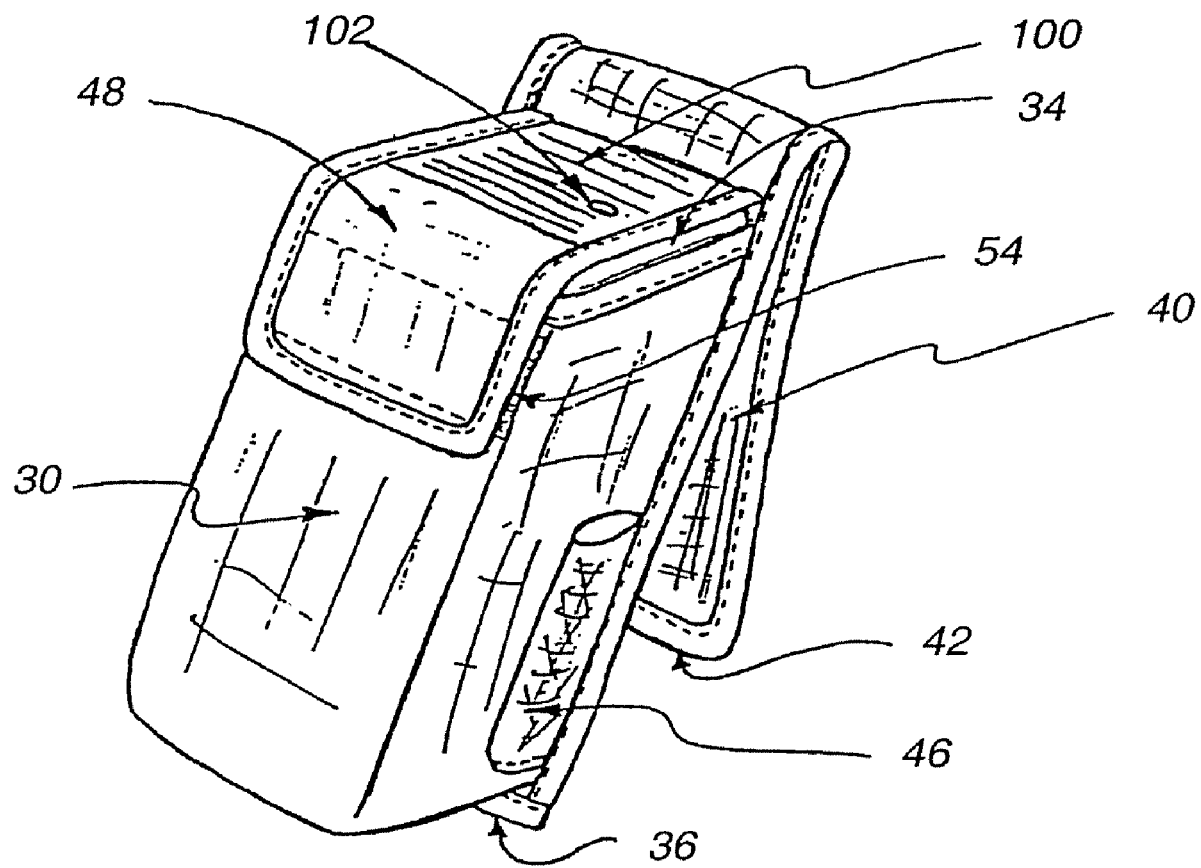
FIG. 14 is a front perspective view of another embodiment of the present invention used to hold a portable camera.

FIG. 14 shows an alternative embodiment of the present invention for use with a camera. In this embodiment, a camera mounting surface 100 is formed by the sheath cover 48. The camera mounting surface 100 preferably contains a mounting screw aperture 102 for selectively mounting a camera to the sheath cover 48 and thus the case body 30. In this manner, the present invention may be used as a camera stand by positioning the selectively adjustable support member 40 in a desired orientation. The camera mounting surface 100 may additionally include a plate (not shown) attached to the sheath cover 48 to provide a more rigid surface for resting a camera.

Figure 20:
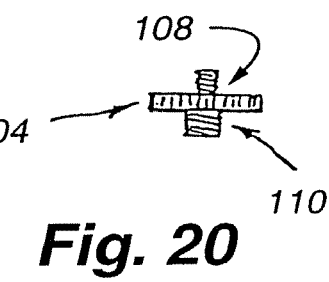
FIG. 20 is a securing screw for use in the embodiment shown in FIG. 15.
Figure 15:
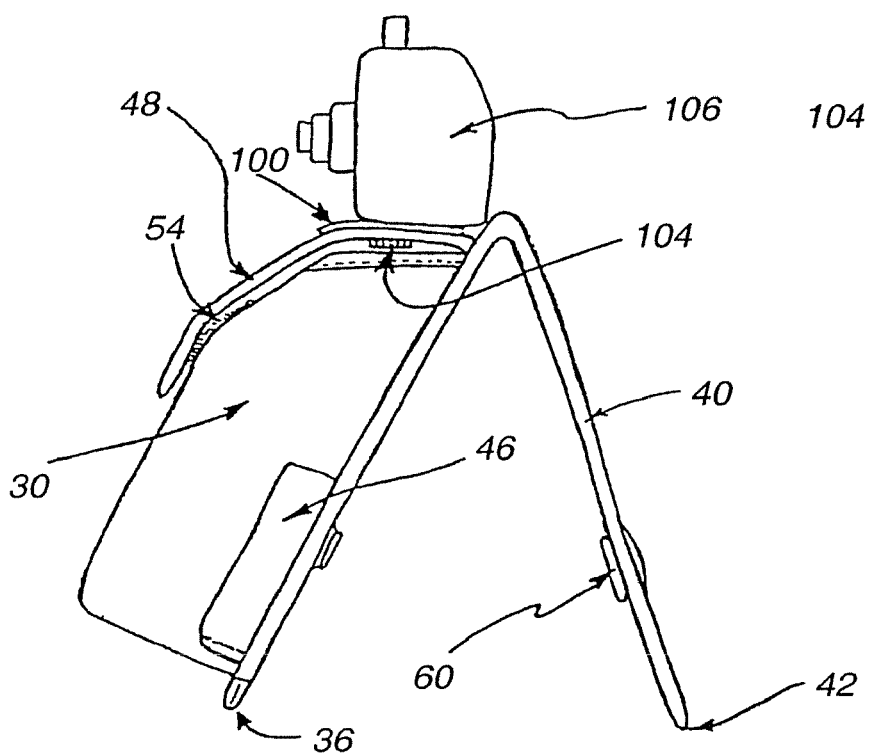
FIG. 15 is a right elevation view of the embodiment shown in FIG. 14 with a camera positioned on top of the case.
Figure 15A:
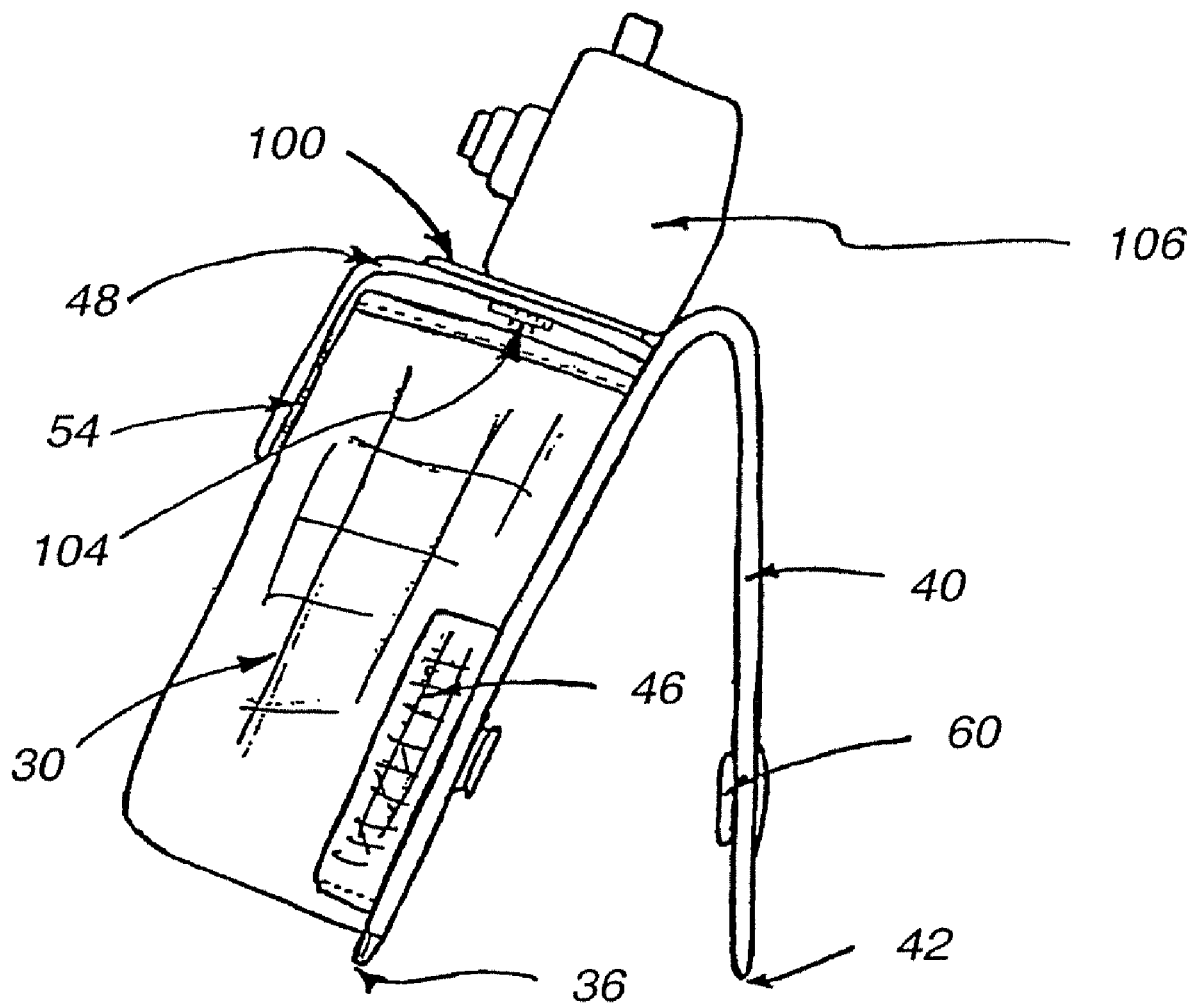

FIG. 15 is a side elevation view of the embodiment of the present invention showing FIG. 14 in application. As depicted, the camera 106 for which the case is sized is nested upon the carrying case body 30 for hands free use. For example, with the use of a timer on a camera, the camera may be secured to the sheath cover 48 and the associated camera mounting surface 100 by means of a mounting screw 104. FIG. 20 shows a possible embodiment of the mounting screw 104 in greater detail. In this embodiment, the mounting screw 104 has opposing sides with two distinct sized threads. The mounting screw minor thread 108 is sized to properly insert into the base of the most common sized small screw receiving cameras. Similarly, the size of the mounting screw major thread 110 is selected to fit the most common sized large screw receiving cameras, and thus has multiple uses.

Figure 16:
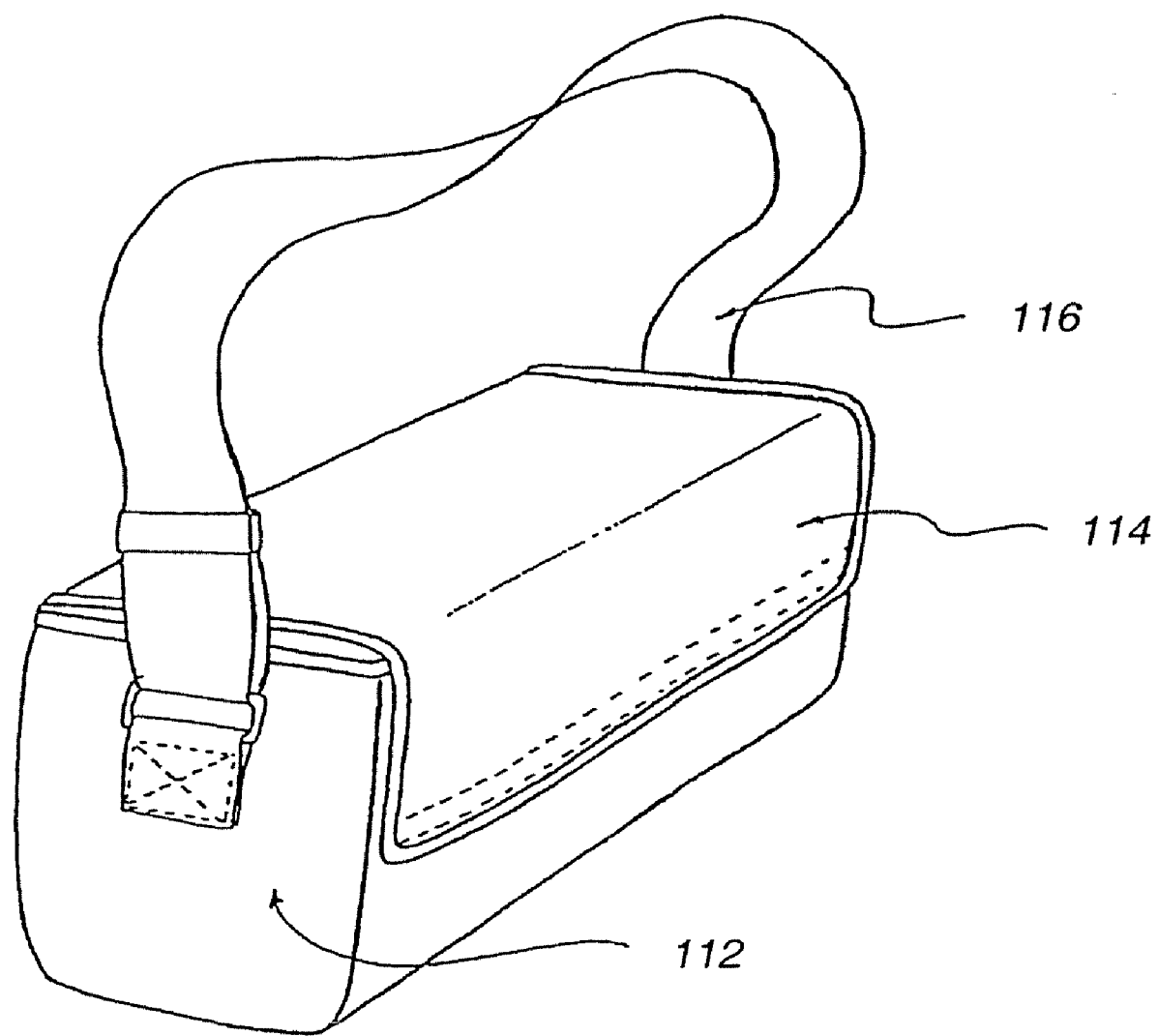
FIG. 16 is a front perspective view of the an alternative embodiment of the present invention.

FIG. 16 shows yet another embodiment of the present invention. In this embodiment, the case body 112 is hingedly connected to a case cover 114. The case cover 114 may be selectively secured to the case body 112 by the case cover securement means 118, which may include a snap, button, hook and loop material or the like. The embodiment of FIG. 16 is shown with a carrying strap 116. The carrying strap 116 is generally secured to the lateral edges of the case body. The embodiment of FIG. 16, however, differs in one important aspect from the embodiments described thus far. In this embodiment, the adjustable support 120 are removably attached to the inside surface of the case cover 114 by Velcro® or other attachment means.

Figure 17:
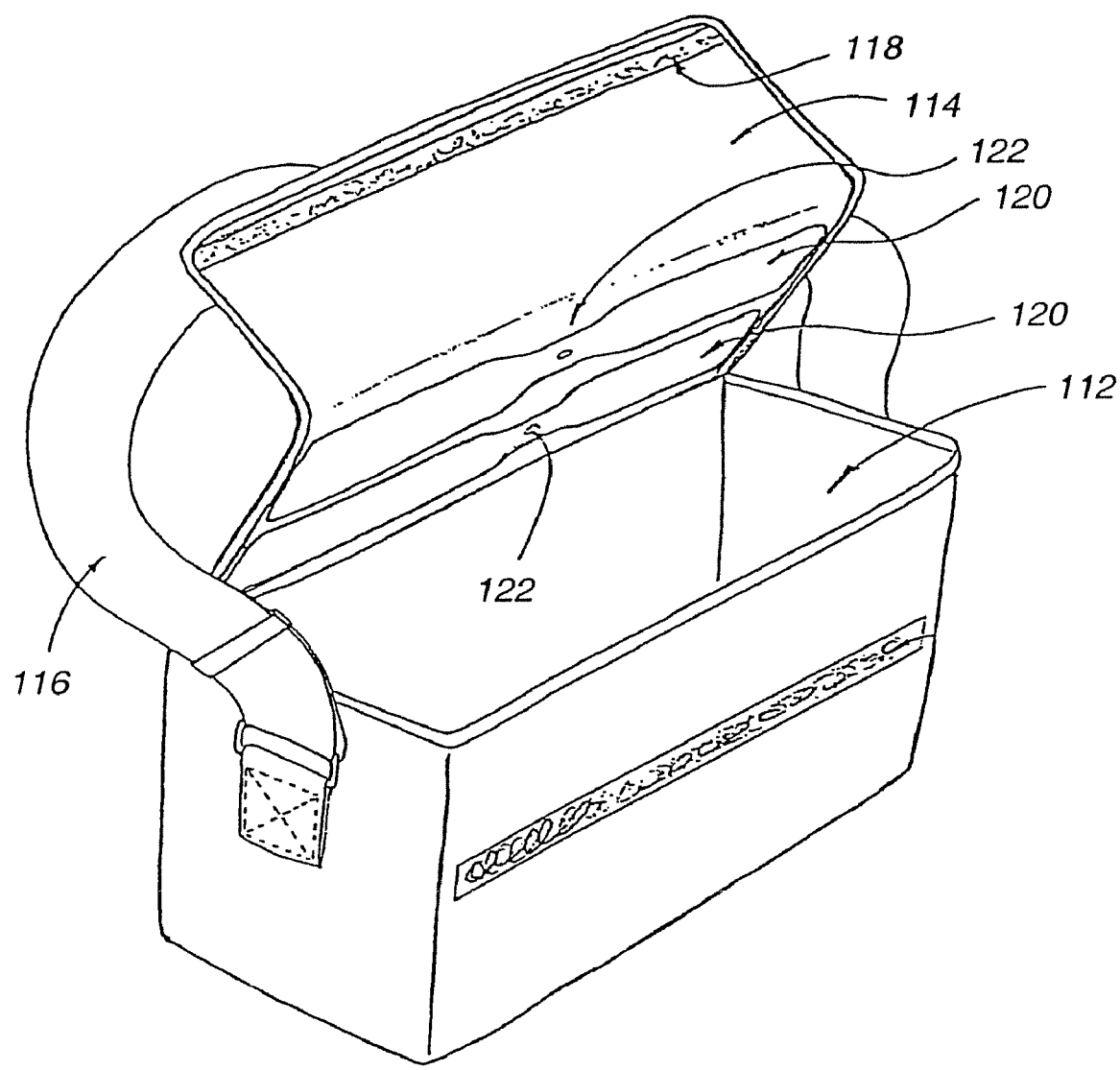
FIG. 17 is a front perspective view of the embodiment shown in FIG. 16 in an open position.
Figure 18:
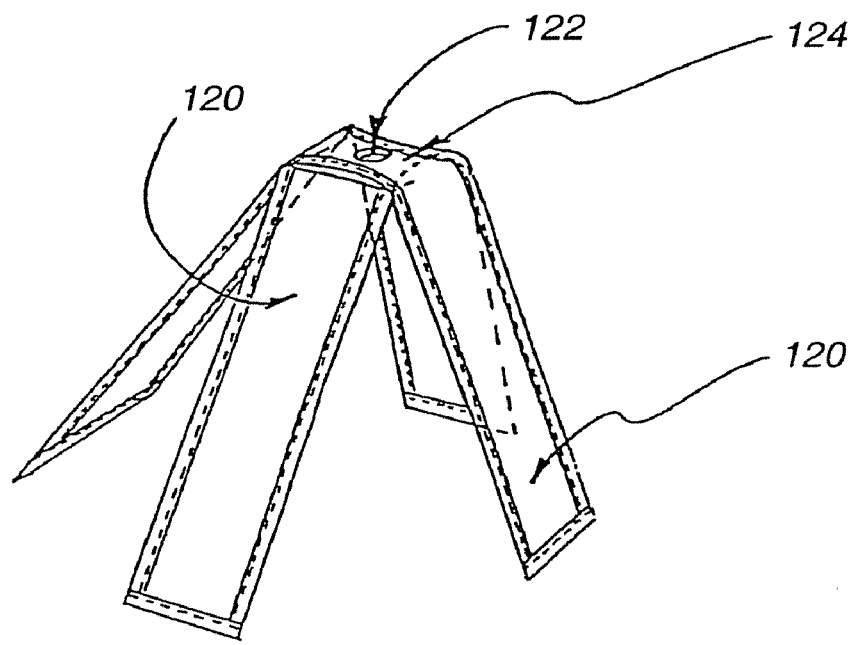
FIG. 18 is a front perspective view of the portable support stand used to hold a camera as shown in a position of use.

As shown in FIG. 17, the embodiment of the present shown in FIG. 16 is shown in the open position. This case body 112 could be used to carry a camera and other ancillary equipment such as a telephoto lens. FIG. 18 shows the removably attached supports 120 from the inside of the case cover 114 in application. The formable supports 120 can be positioned to form a camera stand by using two adjustable supports 120 in tandem. Both adjustable supports 120 preferably have a central screw aperture 122 such that when the screw hole apertures 122 are aligned the two adjustable supports 120 form a mounting platform 124.

Figure 19:
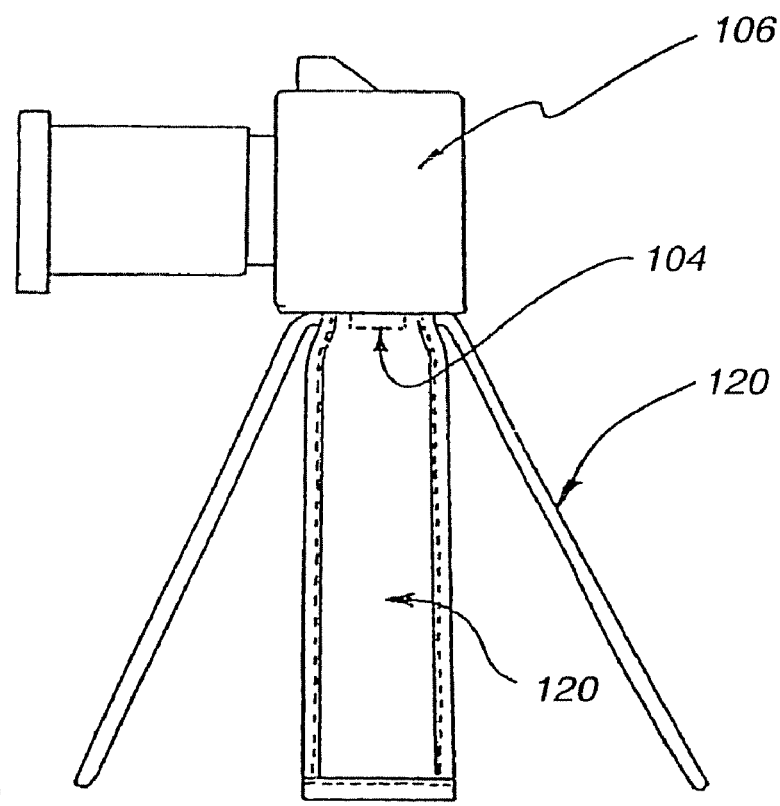
FIG. 19 is a side view of the embodiment shown in FIG. 18, in application with a camera positioned on top of the support stand.
Figure 23:
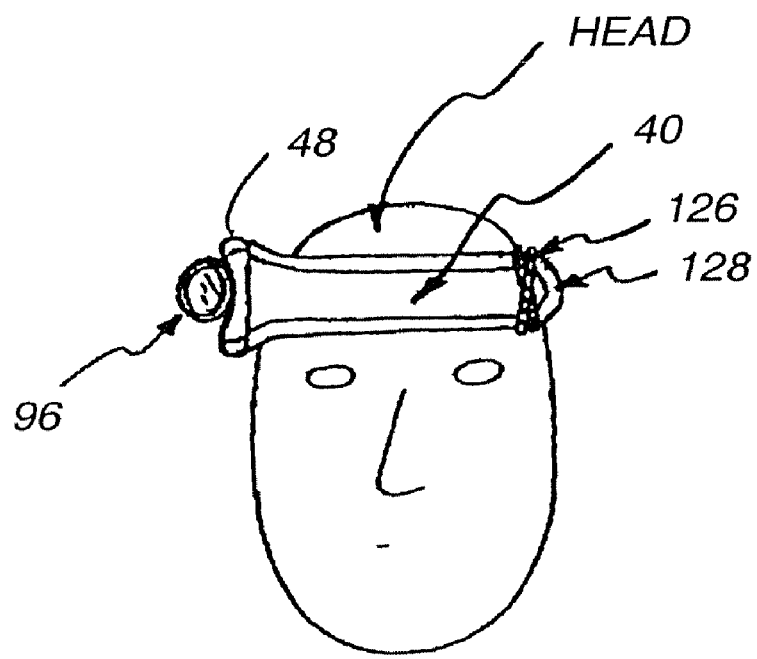
FIG. 23 is a front perspective view of the embodiment shown in FIG. 22 in use as a headband.

FIG. 19 shows the mounting platform 124 of FIG. 23 in application as a camera stand. The mounting screw 104 is inserted through the screw aperture 122 into the camera to provide a secure position. The free ends of the support members may be positioned to properly orient the camera as desired by the user.

Figure 21:
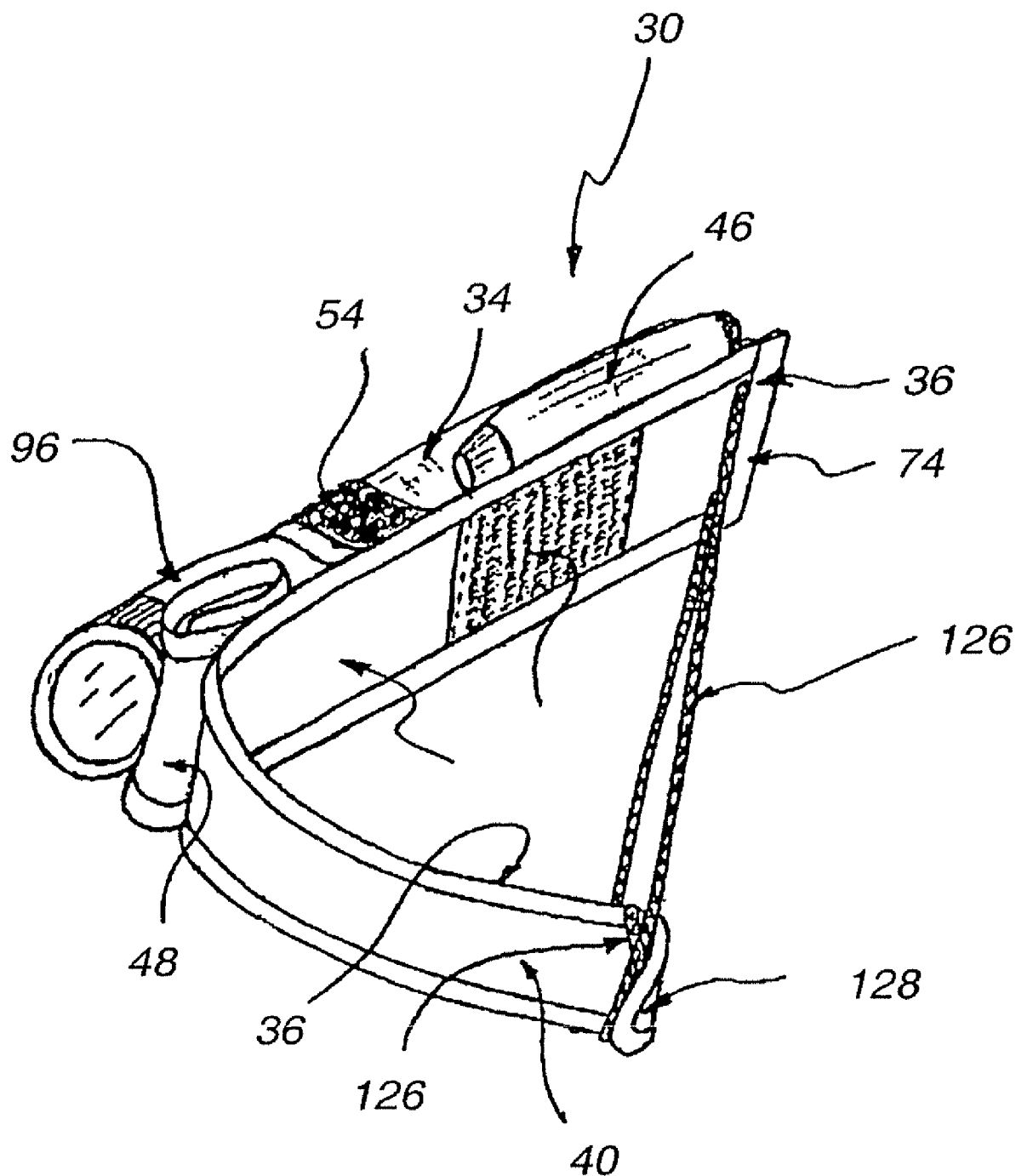
FIG. 21 is a front perspective view of one embodiment of the present invention shown with an elastic cord element.

With reference to FIG. 21, the present invention may also include an elastic cord element 126 on the case body 30 of the present invention which is adapted for use with a flashlight. In the embodiment shown in FIG. 21, the two opposing ends of the elastic cord element 126 are attached to the case body 30 at the base end 36 of the back support 32. The elastic cord element 126 may thus be used to form a loop with the base end 36 of the back support 32. The elastic cord element 126 may be used to maintain the position of the selectively adjustable support member 40. The elastic cord element 126 may also be used in tandem with the adjustable support member 40 to maintain the case body 30 at some position relative to another object. The sheath cover 48 may also be placed behind the item in the sheath 34 to prevent interference, e.g., to prevent the sheath cover 48 from blocking a portion of the light beam from a flashlight in the sheath 34.

As further shown in FIG. 21, a central portion of the elastic cord element 126 may be looped around the adjustable support member 40 to maintain its relative connection. Additionally, a portion of the adjustable support member 40 may be bent on one end to further facilitate the connection. With reference to FIG. 21, the elastic cord element 126 may be placed in a stored position when not in use. One possible storage position of the elastic cord element 126 is created by forming a loop in a central portion of the elastic cord element 126 and placing it over the adjustable support free end 42 and moving the loop to the adjustable support free end 44.

Figure 22:
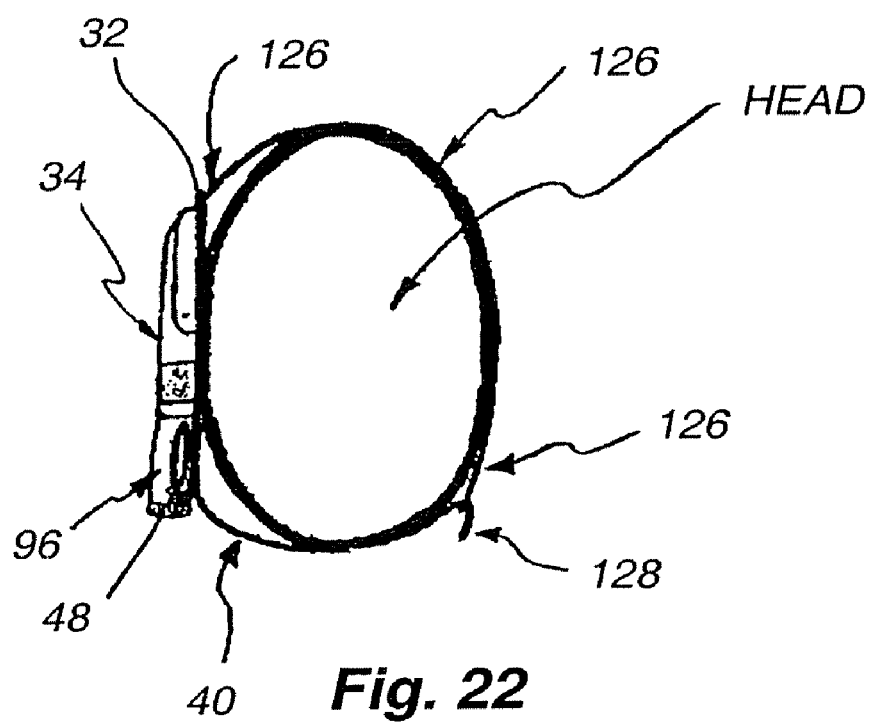
FIG. 22 is a top plan view of the embodiment of FIG. 21 and shown in application as a headband.
Figure 30:
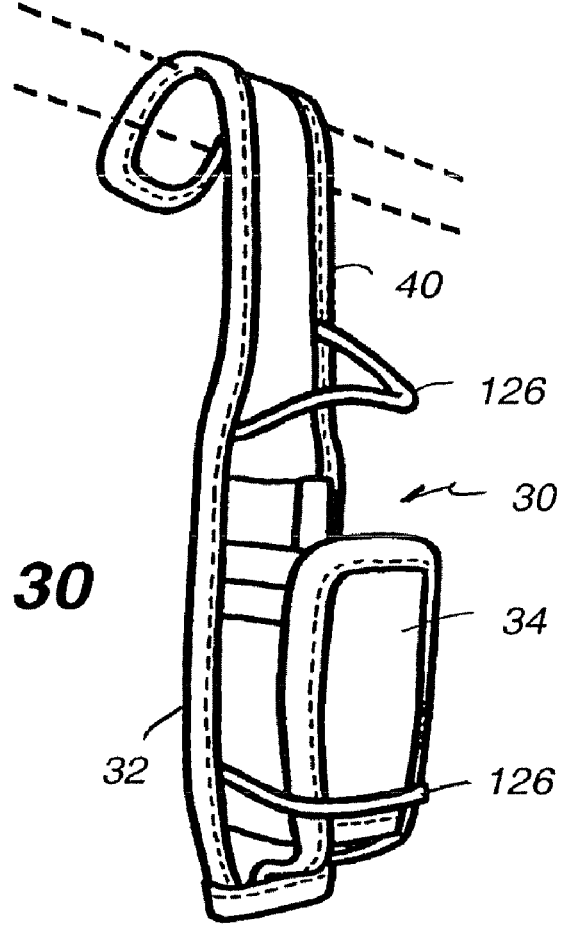
FIG. 30 is a left perspective view of the embodiment of FIG. 27 shown hung over an object.
Figure 31:
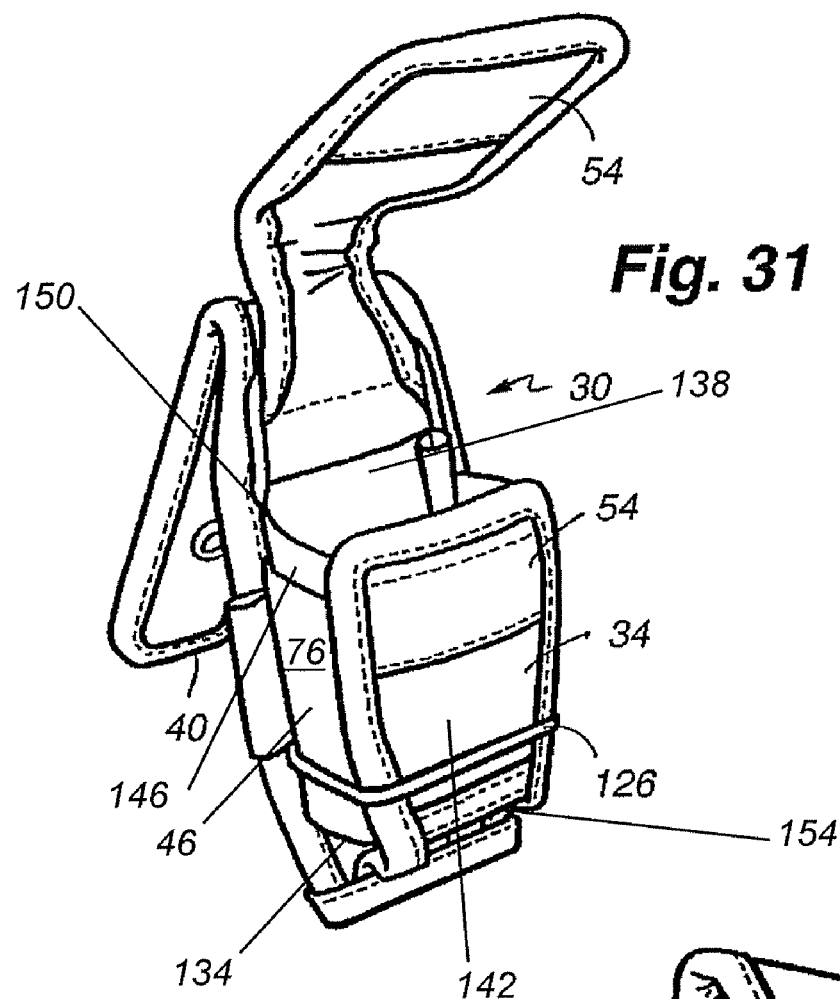
FIG. 31 is a front view of an alternative embodiment of the present invention and designed to hold a cellular phone.
Figure 32:
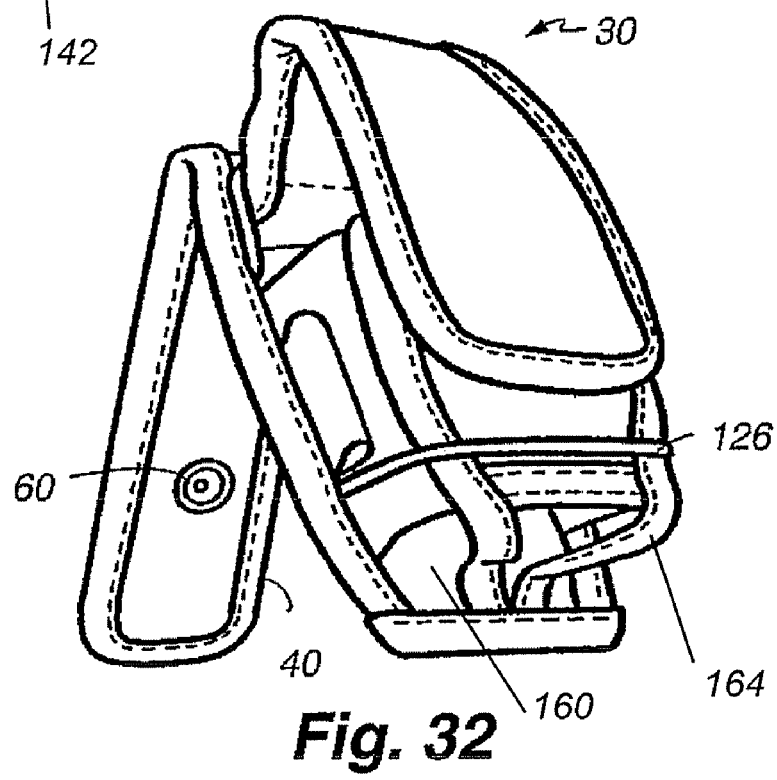
FIG. 32 is a left front perspective view of the embodiment shown in FIG. 31.
Figure 33:
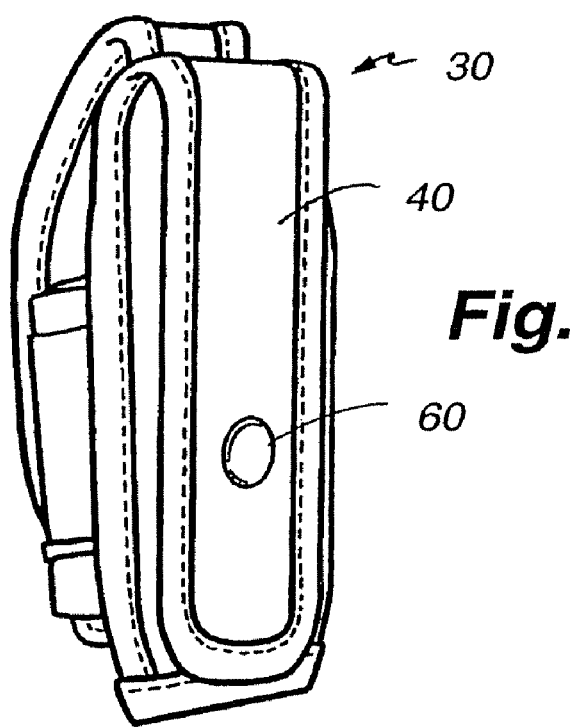
FIG. 33 is a rear perspective view of the embodiment shown in FIG. 31.
Figure 34:
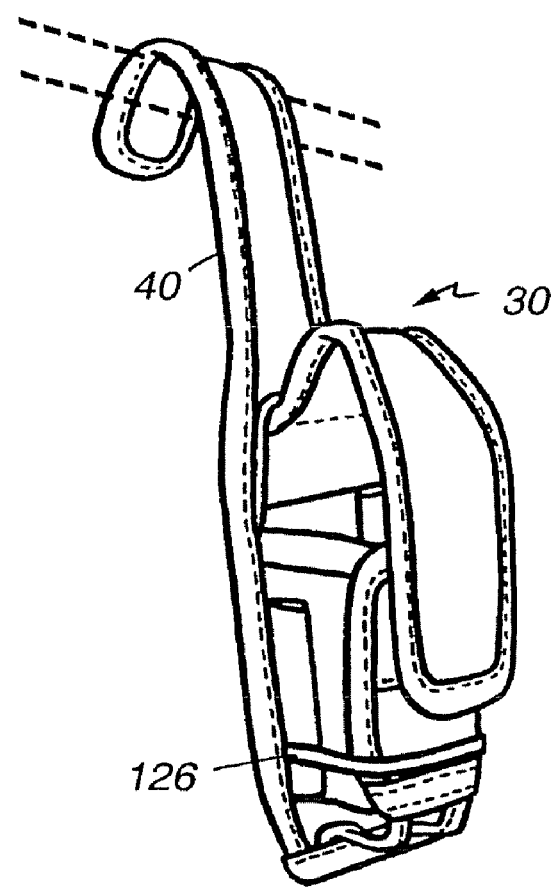
FIG. 34 is left perspective view of the embodiment of FIG. 31 and shown in a hung position of use.

With reference now to FIGS. 22-23, one possible use of the present invention with an elastic cord element 126 is shown. In FIG. 22, the adaptation of the present invention with the elastic cord element 126 for use as a head band is shown in a top plan view. The present invention in this drawing is shown for encasing a flashlight. As shown in FIG. 22, the adjustable support free end 42 may be bent to form a hook 128. The elastic cord element 126 may then be placed over the hook 128 and the head of a user may be placed within the band created by the case body 30, the adjustable support member 40, and the elastic cord element 126. FIG. 23 shows the embodiment of FIG. 30 shown in front plan view. The case body 30 may then be positioned to direct the light beam of the flashlight to user's line of sight, thus allowing for hands-free use of the flashlight.

Figure 24:
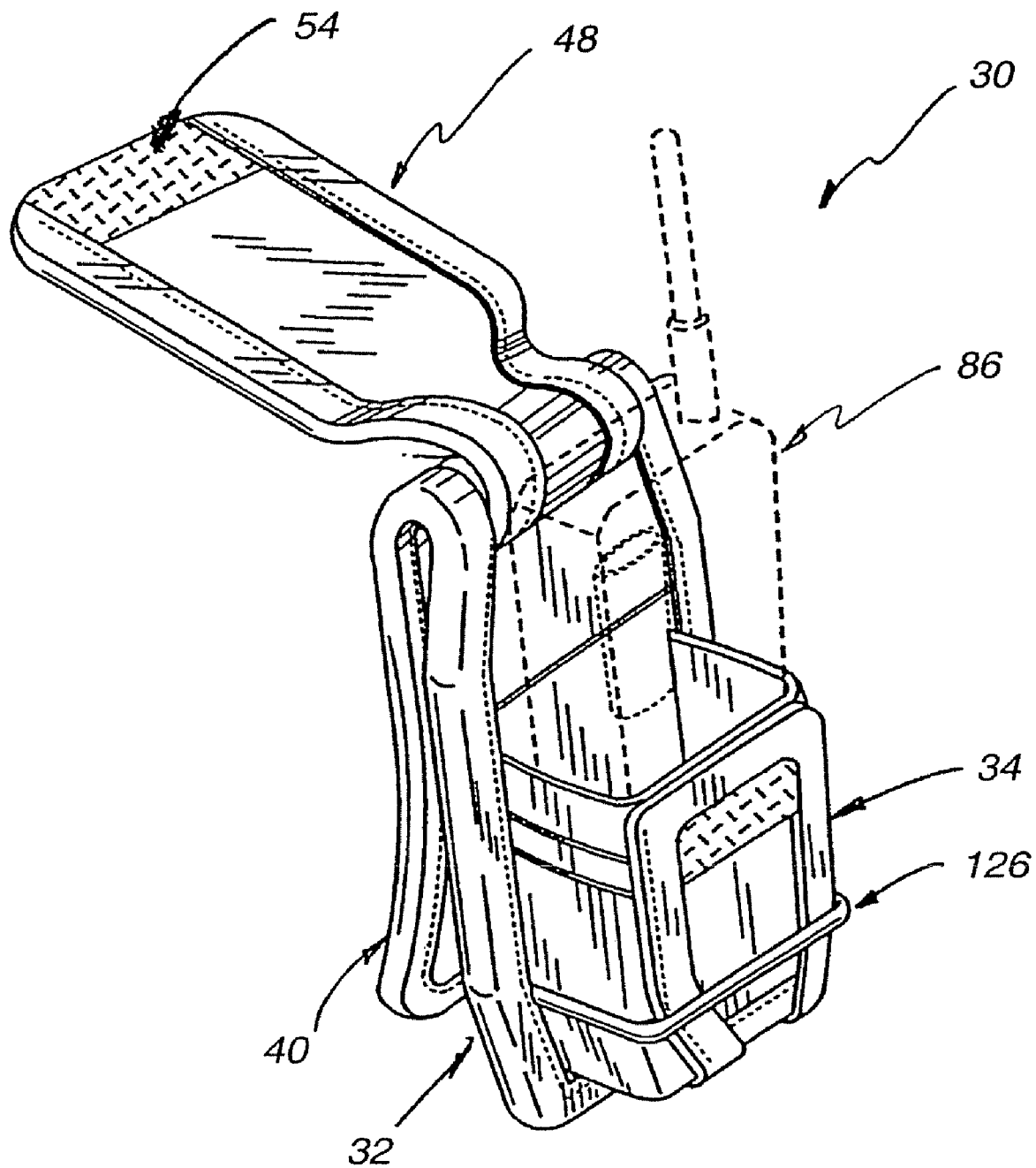
FIG. 24 is a front perspective view of another embodiment of the present invention designed to hold a cell phone.

Referring now to FIG. 24, in one embodiment of the present invention an elastic cord element 126 may be provided on the case to assist in maintaining an object on an exterior portion of the sheath 34. In one embodiment, an elastic cord element 126 may be attached to opposite lateral sides of the back support 32. Alternatively, the elastic cord element 126 may be attached to a portion of the sheath 34. Preferably, the elastic cord element 126 is attached to the opposing lateral sides of the back support 32 closer to the lower end 36 than the upper end 38. If a longer elastic cord element 126 is used, the elastic cord element 126 may be wrapped around the case body 30 a plurality of times to sufficiently hold the stored device, e.g., a cellular telephone 86, to the exterior of the case body 30. If a shorter elastic cord element 126 is used, the elastic cord element 126 may be used to hold the stored device to the exterior of the case body 30 simply by moving the elastic cord element 126 to the front of the case body 30 and inserting the stored device therein. As shown in FIG. 24, the elastic cord element 126 may also be used with the stored electronic device in the sheath 34 to more securely hold the stored device in place.

Figure 25:
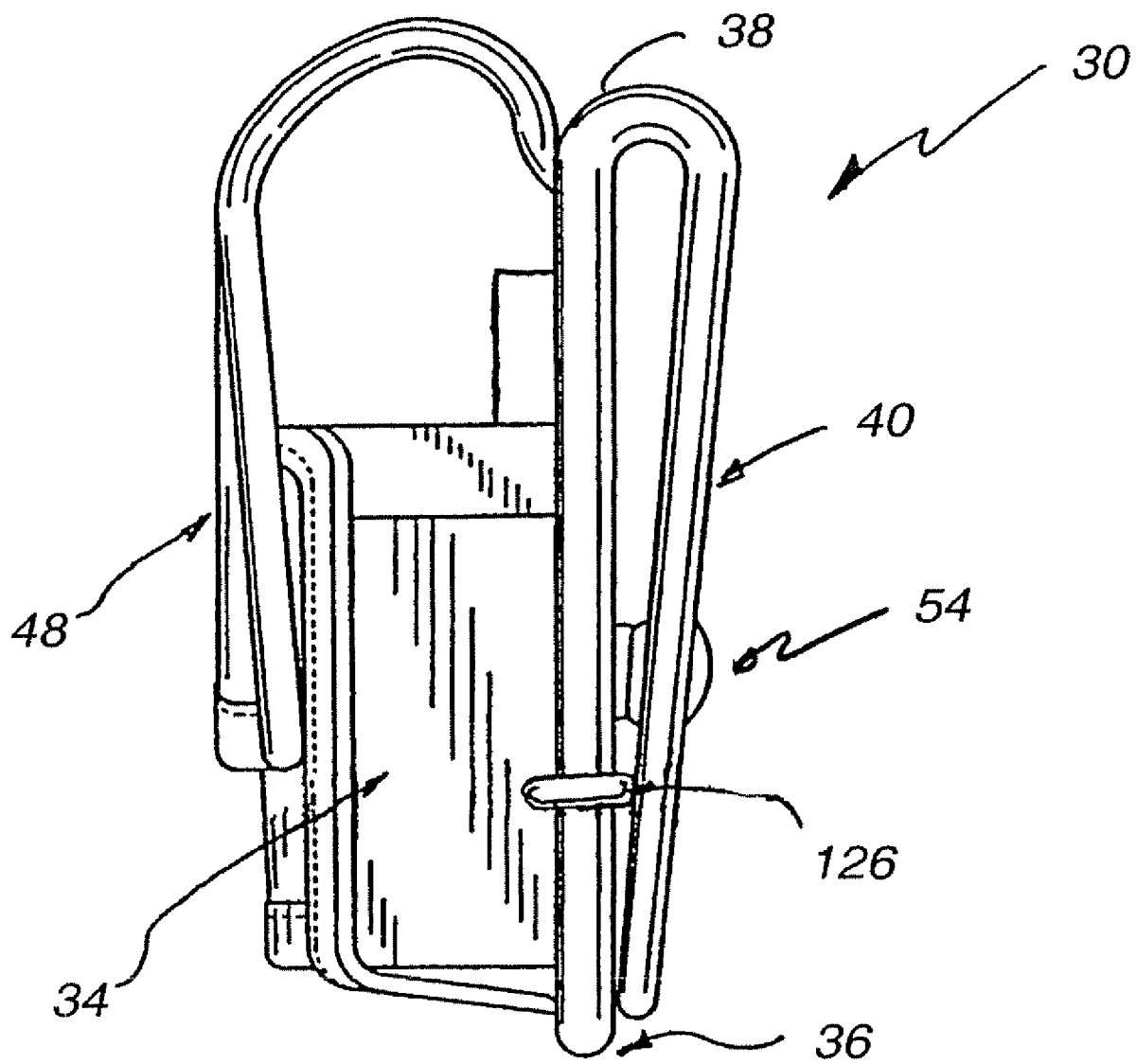
FIG. 25 is a right elevation view of the embodiment shown in FIG. 24 with an elastic cord shown in a stored position.

Referring now to FIG. 25, the embodiment of FIG. 24 is shown in a right elevation view. In this view, the elastic cord element 126 is placed in a position of storage around the back support 32 of the case body 30. In this position, the elastic cord element 126 is placed out of the way to prevent undesired snagging of the elastic cord element 126 on foreign bodies or other interferences. The elastic cord element 126 may be maintained in this position with or without the back support 32 secured to the case body 30 by interconnection mechanism 60.

Figure 26:
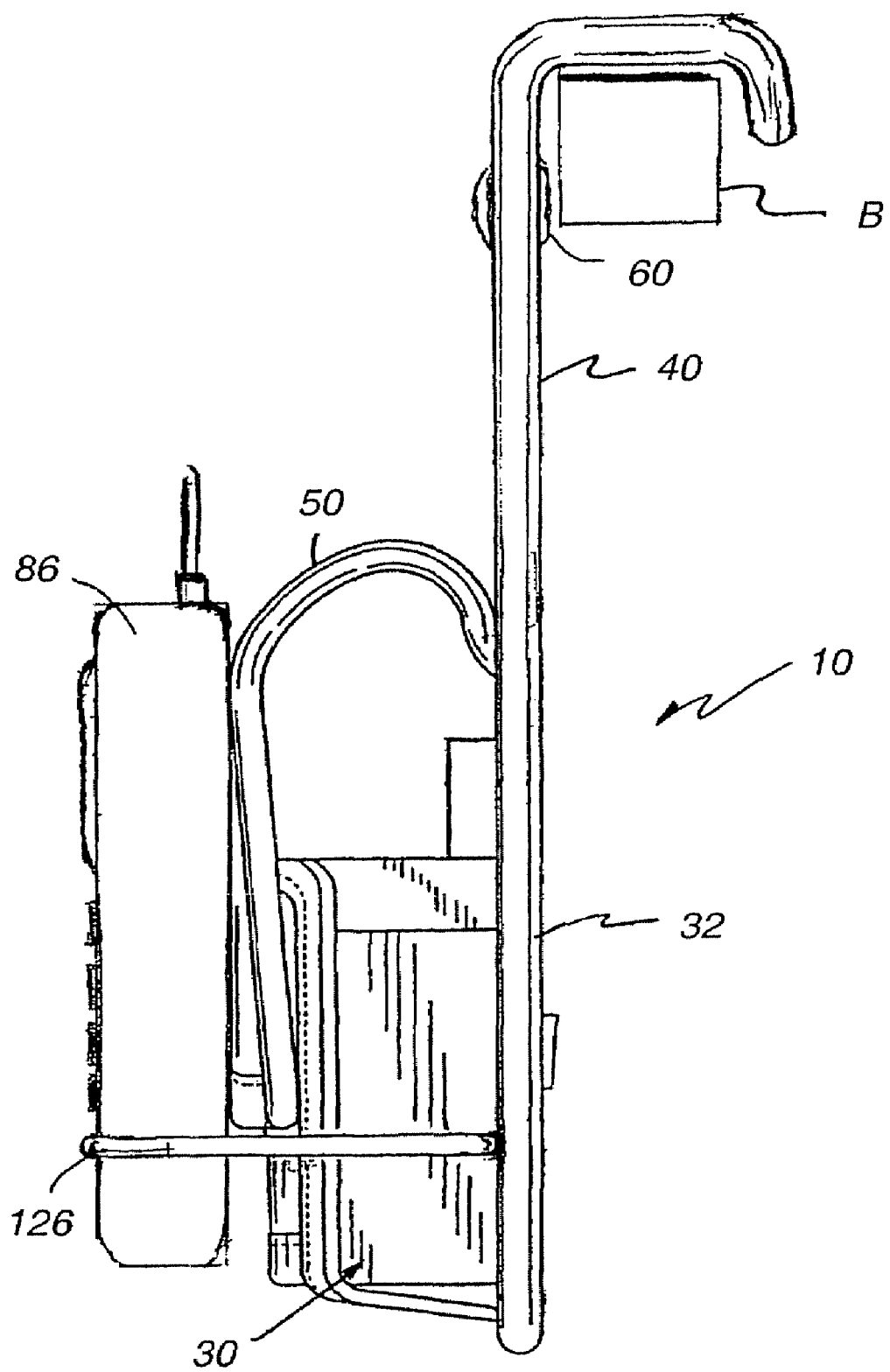
FIG. 26 is a right elevation view of the embodiment of FIG. 25 with the support stand shown hung over an object.
Figure 27:
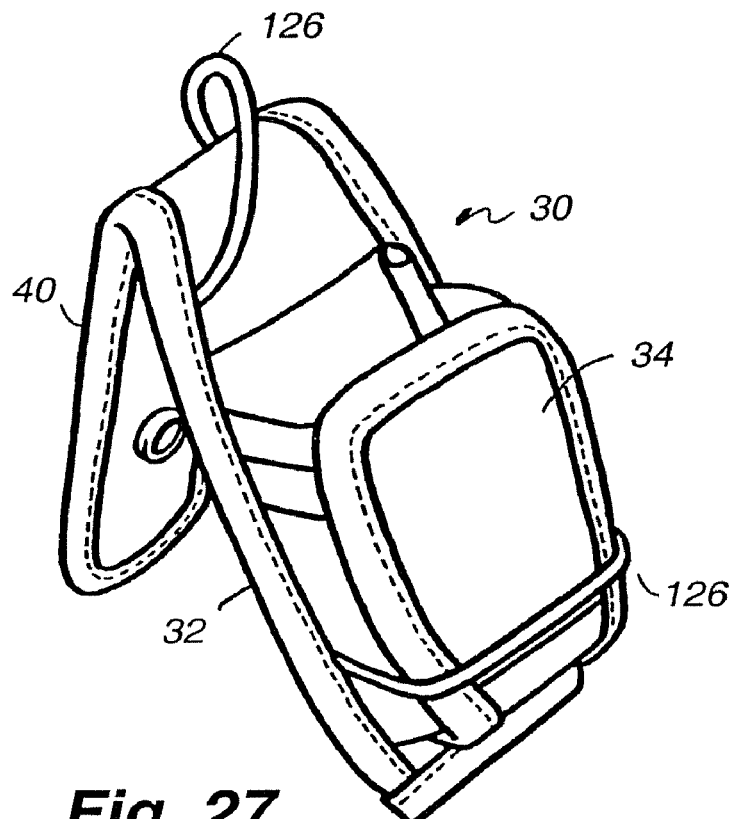
FIG. 27 is a front perspective view of one embodiment of the present invention designed to hold a 2-way radio.
Figure 28:
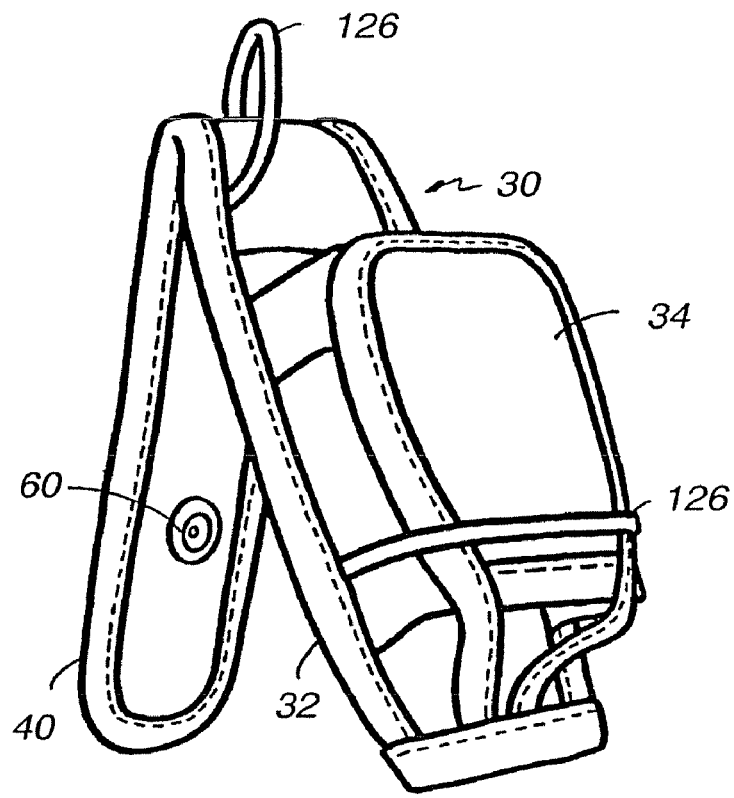
FIG. 28 is a left front perspective view of the invention of FIG. 27.
Figure 29:
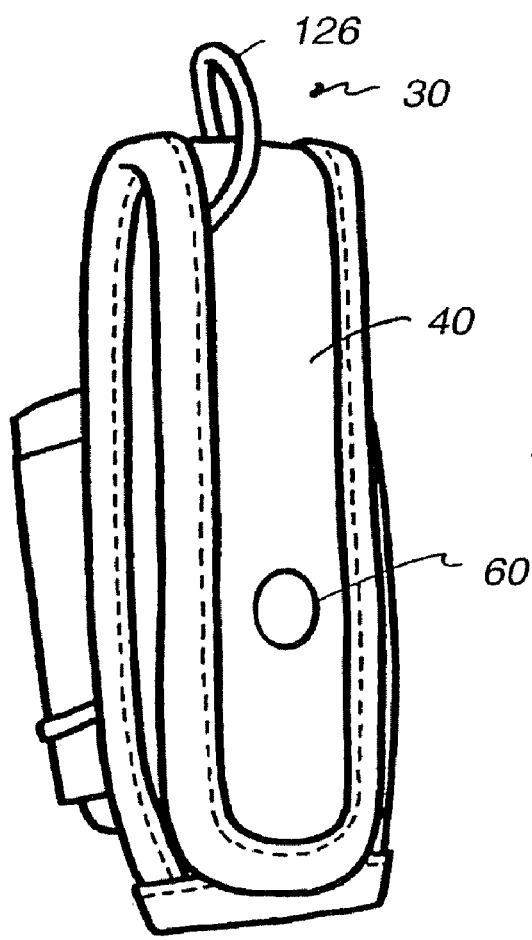
FIG. 29 is a rear perspective view of the invention of FIG. 27.
Figure 35:
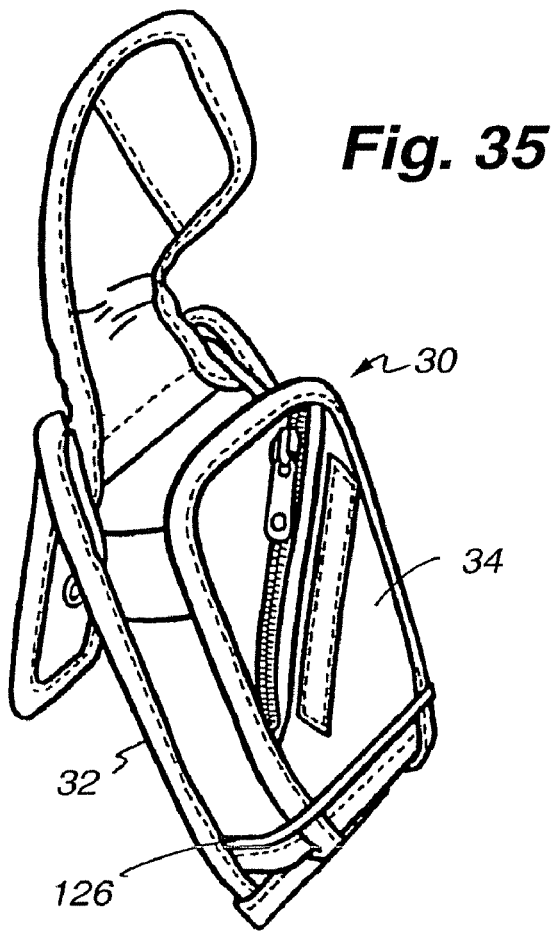
FIG. 35 is a front perspective view of an alternative embodiment of the present invention, designed and used to hold a personal digital assistant.
Figure 36:
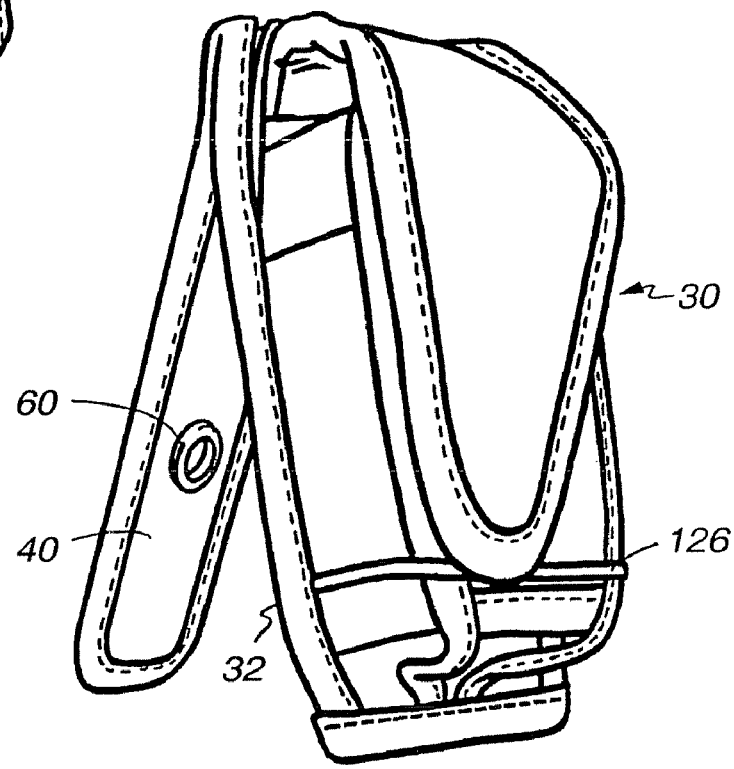
FIG. 36 is a left front perspective view of the embodiment shown in FIG. 35 with the flap down.
Figure 37:
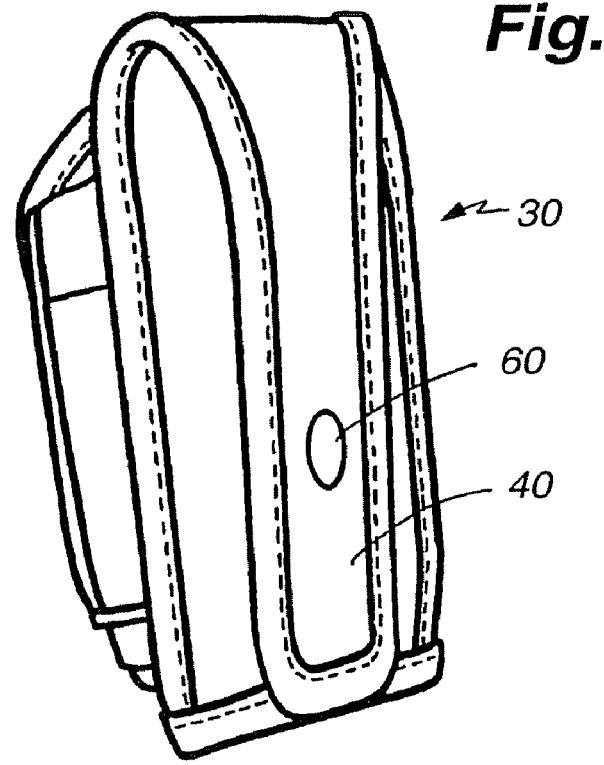
FIG. 37 is a rear perspective view of the embodiment shown in FIG. 35.
Figure 38:
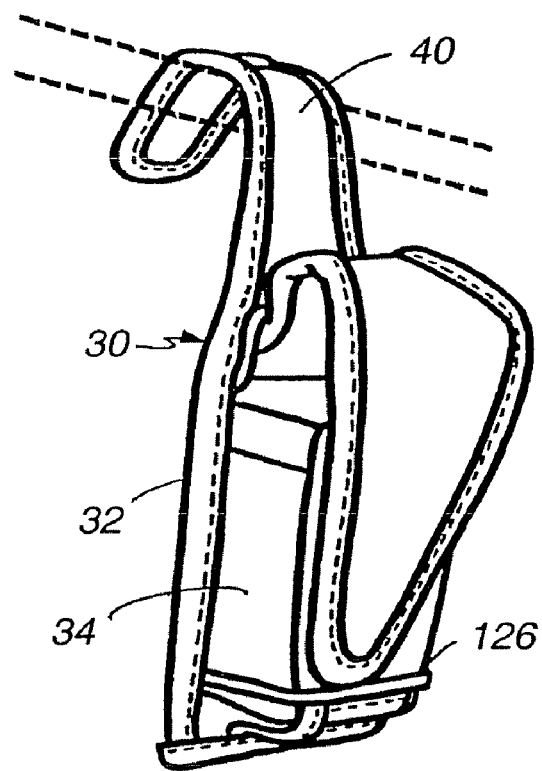
FIG. 38 is a front perspective view of the embodiment of FIG. 35 and shown hung from an object.
Figure 39:
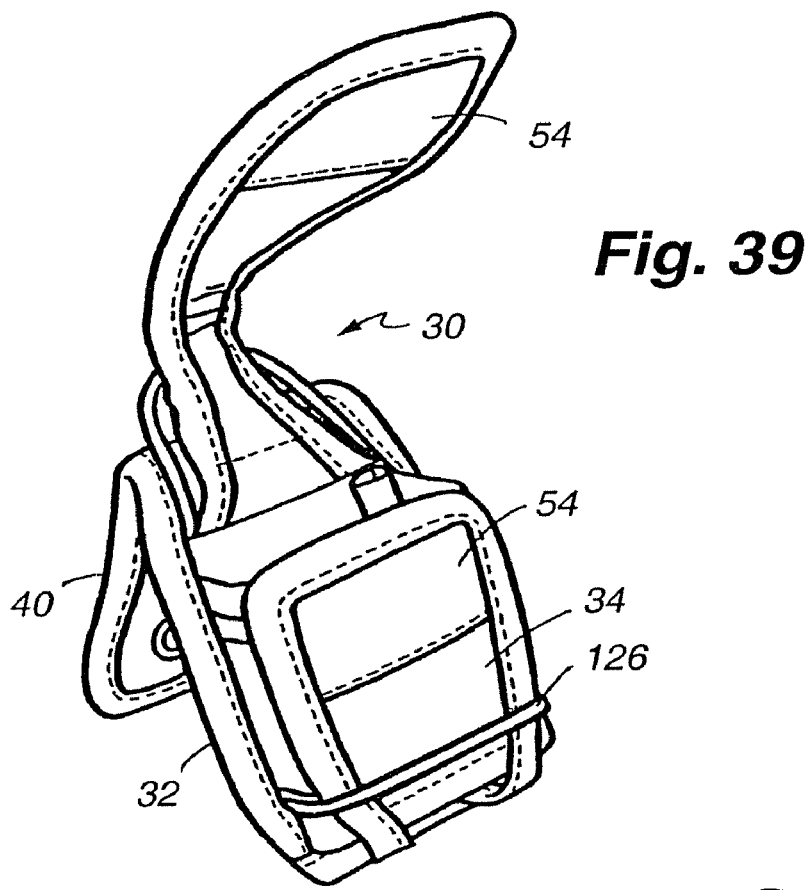
FIG. 39 is a front perspective view of an alternative embodiment of the present invention which is designed to hold a global positioning system.
Figure 40:
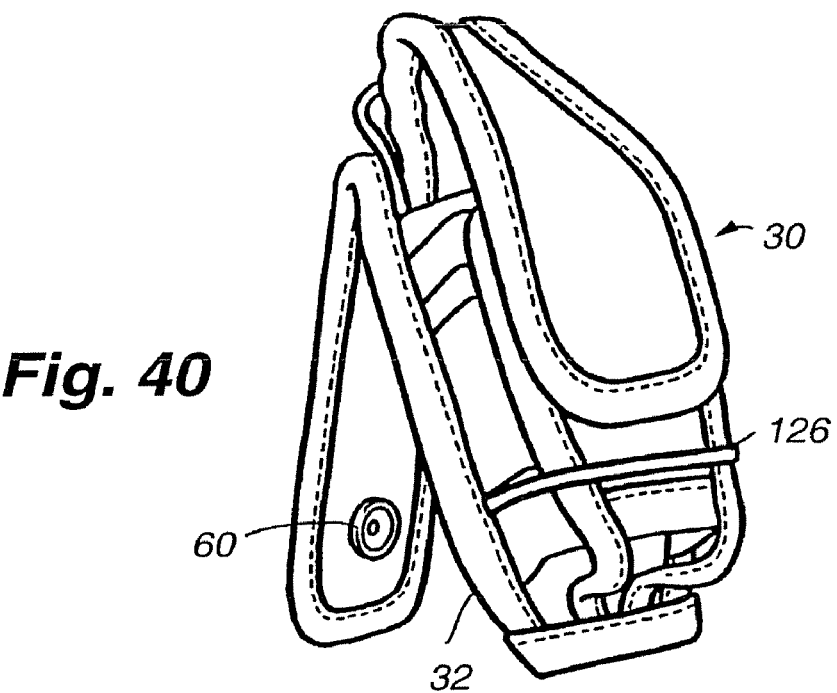
FIG. 40 is a left front perspective view of the embodiment of FIG. 39.
Figure 41:
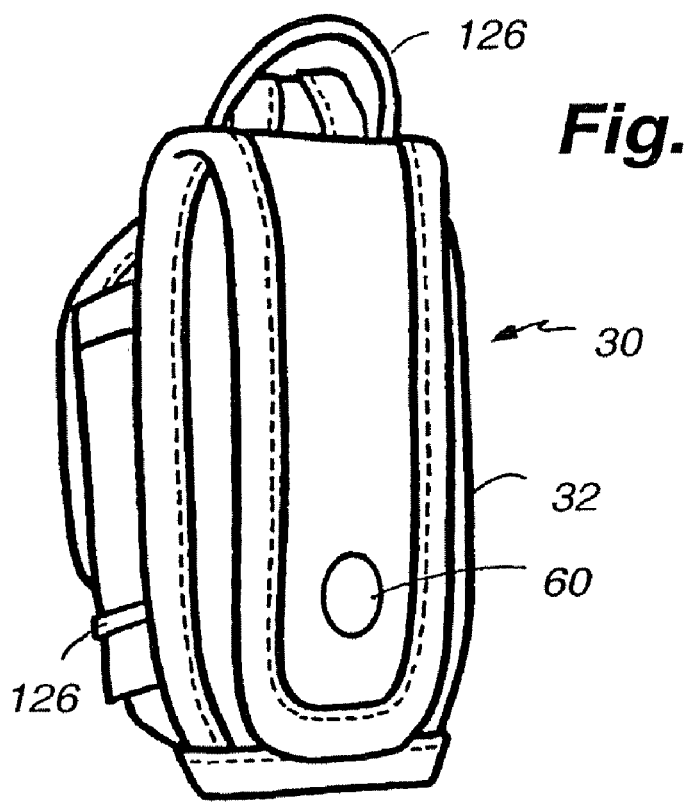
FIG. 41 is a rear perspective view of the embodiment of FIG. 39.
Figure 42:
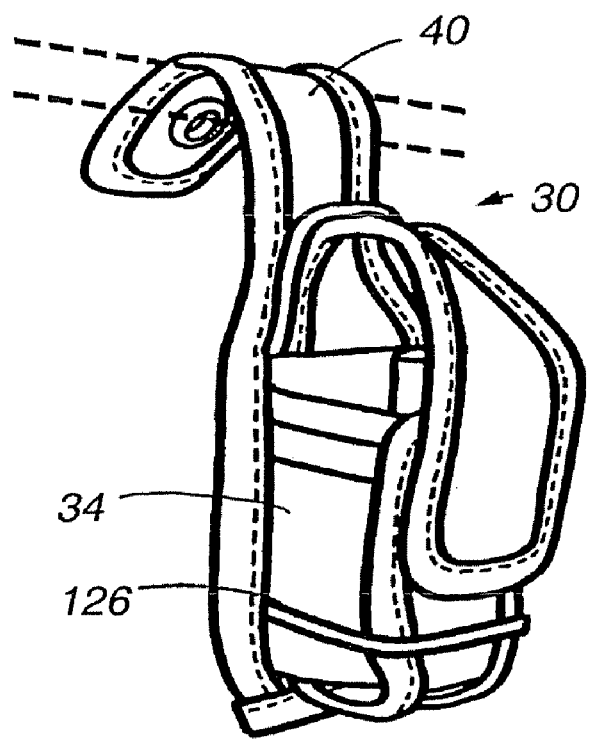
FIG. 42 is a front elevation view of the embodiment of FIG. 39, and shown hung from an object.

With reference now to FIG. 26, the embodiment of claim 24 is shown in a right elevation view. In this embodiment, the elastic cord element 126 is used to secure an object, e.g., a cellular telephone 86, normally stored within the sheath 34 to the exterior of the case body 30. The elastic cord element 126 may also be used to store an additional object, e.g., a note pad or other device, to the exterior of the case body 30 with or without the normally stored object within the sheath 34. Additionally, FIG. 35 shows how the selectively adjustable support member 40, because it is reversibly bendable along at least substantially its entire length, may be bent in a plurality of directions to accommodate the necessary usage. In this figure, the selectively adjustable support member 40 is bent to form a hook such that the case body 30 may be supported by an object B. Once the hooking of the case body 30 is no longer required, the selectively adjustable support member 40 may be bent back to its original shape and placed once again in a storage position or bent to form another desired orientation.

Referring now to FIGS. 27-30, numerous depictions of one embodiment of the present invention is provided herein. More specifically, a case for a two-way radio is shown. Likewise, FIGS. 31-34 are drawings of a case for a cell phone, FIGS. 35-38 are drawings of a case for a PDA, and FIGS. 39-42 are drawings depicting a case for a GPS.

Figure 43:
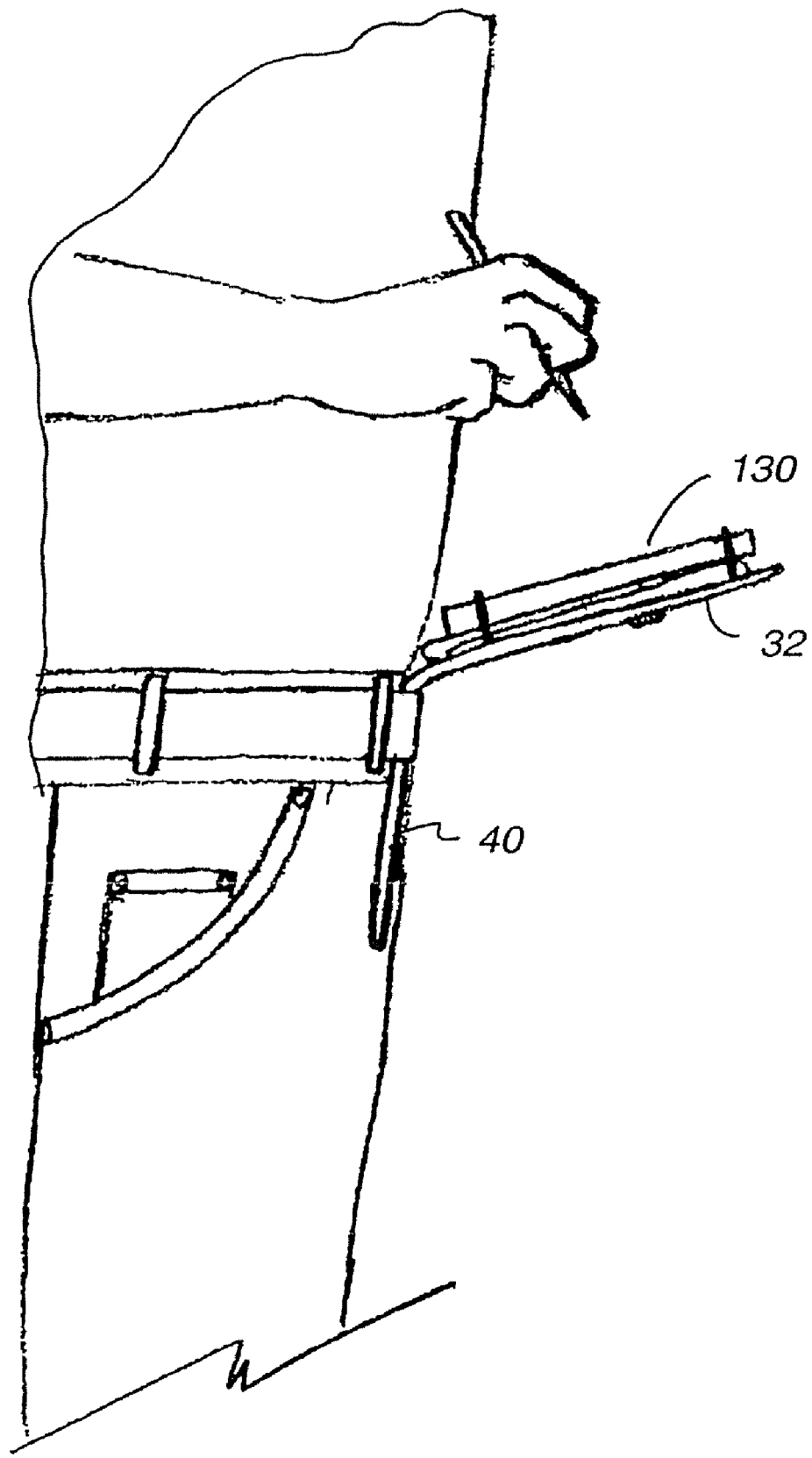
FIG. 43 is a front elevation view of the present invention in use in combination with an electronic apparatus.
Figure 44:
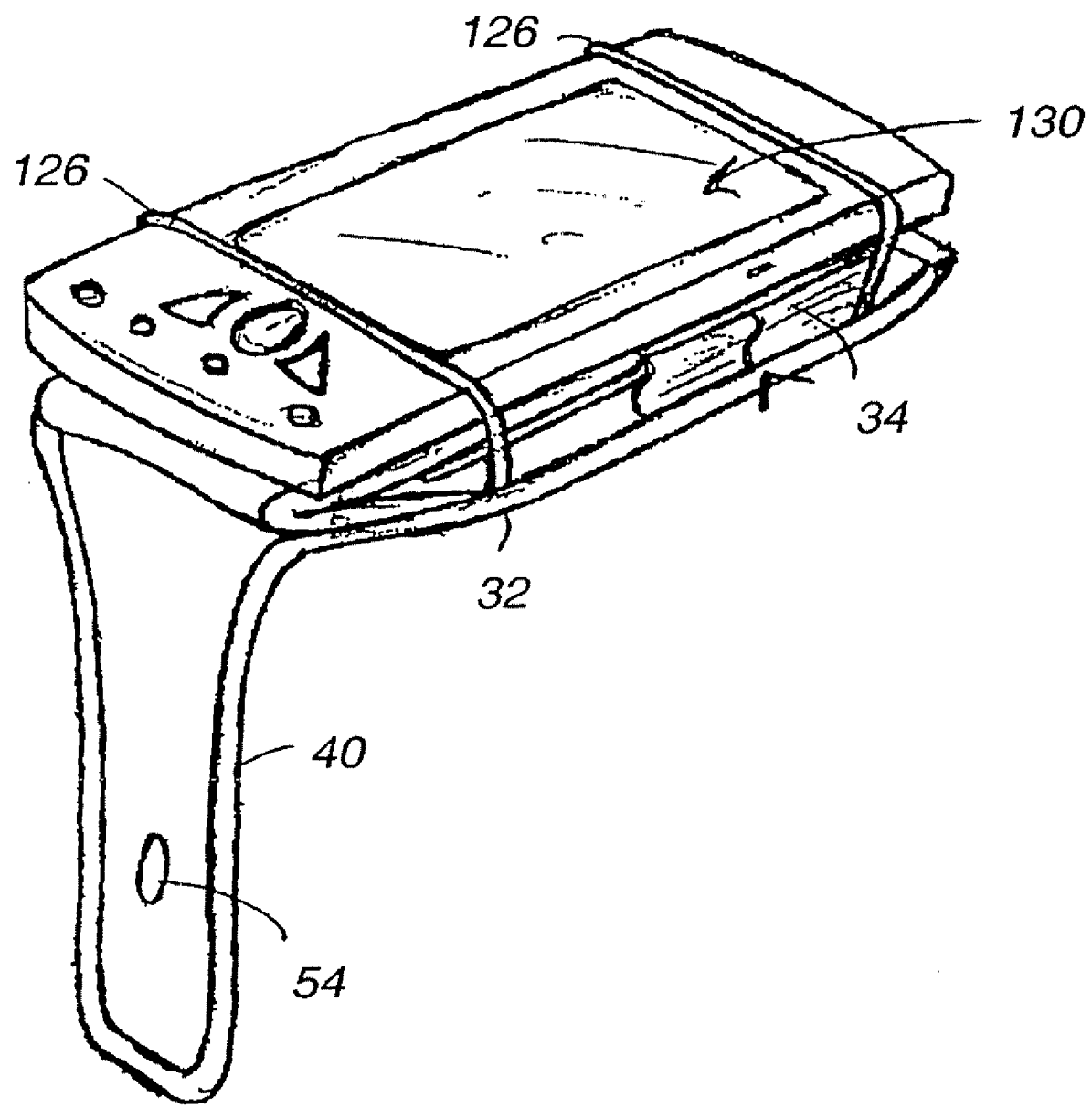
FIG. 44 is a right front perspective view of the invention shown in FIG. 43 with the selectively adjustable support member removed from a user's belt.

Referring now to FIGS. 43-44, one additional aspect of the present invention is provided herein. More specifically, a case designed to hold a PDA or other electronic device is provided, and as shown interconnected to a user's belt in FIG. 43. As depicted, the selectively adjustable support member 40 may be positioned behind a user's belt, while the interconnected back support member 40 and sheath 34 are oriented upwardly in a position which allows the PDA to be used in any number of desired configurations which are convenient for the user. FIG. 44 is a front perspective view of the carrying case and associated PDA shown in FIG. 43, with the device removed from the user's belt and identifying the interconnection of the PDA to the exterior of the sheath by the use of elastic cords 126. As appreciated by one skilled in the art, the carrying case shown in FIGS. 43-44 can be used to carry any type of electronic or non-electronic devices.

To assist in the understanding of the invention and associated drawings, the following list of components and associated numbering are included herein.

| # | Component |
|---|---|
| 30 | case body |
| 32 | back support |
| 34 | Sheath |
| 36 | back support lower end |
| 38 | back support upper end |
| 40 | selectively adjustable support |
| 42 | adjustable support free end |
| 44 | adjustable support connection end |
| 46 | storage sleeves |
| 48 | sheath cover |
| 50 | sheath cover flap end |
| 52 | sheath cover secured end |
| 54 | cover securement device |
| 55 | writing instrument |
| 56 | reflective lining |
| 58 | Eyelet |
| 60 | interconnection mechanism |
| 62 | flashlight bulb holder |
| 64 | bendable support |
| 66 | inner support lining |
| 68 | outer support lining |
| 70 | inner fabric cover |
| 72 | outer fabric cover |
| 74 | support edge covering |
| 76 | elastic fabric |
| 84 | cellular phone wallet |
| 86 | cellular telephone |
| 88 | Logo |
| 90 | wallet business card pocket |
| 92 | wallet money pocket |
| 94 | nail clippers |
| 96 | Flashlight |
| 98 | shoulder strap |
| 100 | camera mounting surface |
| 102 | mounting screw aperture |
| 104 | mounting screw |
| 106 | Camera |
| 108 | mounting screw minor thread |
| 110 | mounting screw major thread |
| 112 | Case |
| 114 | case cover |
| 116 | carrying strap |
| 118 | case cover securement means |
| 120 | removably attached support |
| 122 | screw aperture |
| 124 | mounting platform |
| 126 | elastic cord element |
| 128 | Hook |
| 130 | personal digital assistant |
| 134 | crease |
| 138 | back panel |
| 142 | front panel |
| 146 | lateral surface |
| 150 | upper end of sheath |
| 154 | lower end of sheath |
| 160 | aperture |
| 164 | support |

The foregoing exemplary descriptions and the illustrative preferred embodiments of the present invention have been explained in the drawings and described in detail with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A flexible case adapted for carrying and protecting a handheld device, comprising:
   a case body comprising a back panel, a front panel and opposing stretchable lateral surfaces positioned therebetween that define a flexible sheath adapted to receive the handheld device, said flexible sheath also comprising an upper end and a lower end, said opposing stretchable lateral surfaces each having a first edge associated with said front panel and a second edge associated with said back panel to define a width of said lateral surface; and
   at least one storage sleeve interconnected to at least one of said opposing lateral surfaces, said at least one storage sleeve including a first edge interconnected adjacent to said front panel and a second edge interconnected adjacent to said back panel, wherein said first edge of at least one of said opposing stretchable lateral surfaces coincides with said first edge of said storage sleeve and wherein said second edge of at least one of said opposing stretchable lateral surfaces coincides with said second edge of said storage sleeve such that said at least one storage sleeve spans said width of said at least one of said opposing stretchable lateral surface and rests flat against said at least one opposing stretchable lateral surface when said at least one storage sleeve is positioned in a non-deflected state, and wherein said flexible sheath and said at least one storage sleeve are both resiliently deflectable to allow the selective insertion and removal of the handheld device and to allow for the secondary storage of an accessory device in said at least one storage sleeve.

2. The flexible case of claim 1, wherein said case body is further defined by at least one support member interconnected to said lower end of said flexible sheath and said back panel for supporting the handheld device.

3. The flexible case of claim 1, further comprising at least one secondary storage sleeve interconnected to said at least one storage sleeve, said at least one secondary storage sleeve comprising a resiliently deflectable material that is capable of assuming a generally tubular shape to retain at least one of a flashlight, a battery and a tool.

4. The flexible case of claim 1, further comprising a support member having a free end, a connecting end and opposing lateral edges positioned therebetween, said support member being reversibly bendable along substantially an entire length and interconnected on said connecting end to said flexible sheath, wherein said support member can be maintained substantially adjacent to said flexible sheath or selectively bent to either support or hang said flexible case in a plurality of positions.

5. The flexible case of claim 1, wherein said at least one storage sleeve is capable of resiliently deflecting to secure a handheld tool, a writing device, or a flashlight.

6. The flexible case of claim 1, further comprising a support member having a free end, a connecting end and opposing lateral edges positioned therebetween, said support member being generally rigid along substantially an entire length and interconnected on said connecting end to said case body, wherein said support member can be maintained substantially adjacent to said case body or selectively rotated therefrom to support said flexible case.

7. The flexible case of claim 1, wherein said case body is further defined by at least one support member interconnected to said lower end and said back panel, said at least one support member having at least one aperture wherein removal of the handheld device is facilitated by pushing upwardly through the aperture on the handheld device.

8. The flexible case of claim 7, wherein the handheld device includes an antenna and said support member is capable of supporting the handheld device in an inverted orientation wherein at least a portion of the antenna extends through said aperture.

9. A flexible case adapted for carrying and protecting an electronic handheld device, comprising:
   a case body comprising a front panel, a back panel and opposing lateral surfaces positioned therebetween that defines an interior space to receive the electronic handheld device, said case body also comprising an upper end and a lower end, said opposing lateral surfaces each having a first edge associated with said front panel and a second edge associated with said back panel to define a width of said lateral surface;
   at least one stretchable storage sleeve adapted for receiving and storing an accessory item which is interconnected to at least one of said opposing lateral surfaces, wherein said case body and said at least one stretchable storage sleeve are resiliently deflectable to allow the selective insertion and removal of the handheld device and wherein the at least one stretchable storage sleeve is accessible to a user while the flexible case is positioned on a user's belt or pocket, and wherein said at least one stretchable storage sleeve includes a first edge, which coincides with said first edge of said at least one opposing lateral surface, and a second edge, which coincides with said second edge of said at least one opposing lateral surface such that said at least one stretchable storage sleeve spans said width of said at least one opposing lateral surface and is positioned substantially flat against said opposing lateral surface when said at least one stretchable storage sleeve is positioned in a non-deflected state; and
   at least one strap positioned adjacent to said lower end and interconnected to at least one of said front panel and said opposing lateral surface to said back panel that is capable of supporting the handheld device.

10. The flexible case of claim 9, wherein the electronic handheld device includes an antenna, and wherein the antenna is adapted to fit through said aperture when said handheld device is inverted and positioned within said flexible case.

11. The flexible case of claim 9, further comprising at least one secondary storage means interconnected to said at least one stretchable storage sleeve, said at least one secondary storage means comprising an elastic material capable of storing at least one of a flashlight, a knife, a battery and a tool.

12. The flexible case of claim 9, further comprising a support member having a free end, a connecting end and opposing lateral edges positioned therebetween, said support member being reversibly bendable along substantially an entire length and interconnected on said connecting end to said case body, wherein said support member can be maintained closely adjacent to said case body or selectively bent to either support or hang said flexible case in a plurality of positions.

13. The flexible case of claim 9, wherein said at least one stretchable storage sleeve is capable of resiliently deflecting to secure a tool, a writing device, a flashlight, an item with a substantiality constant cross section, or an item with a varied cross section.

14. The flexible case of claim 9, wherein said at least one stretchable storage sleeve is a resiliently deflectable material selected from at least one of a spandex, a rubber, a plastic, a lycra, a nylon, a neoprene, and a leather material.

15. The flexible case of claim 9, further comprising a support member having a free end, a connecting end and opposing lateral edges positioned therebetween, said support member being generally rigid along substantially an entire length and interconnected on said connecting end to said case body, wherein said support member can be maintained substantially adjacent to said case body or selectively rotated therefrom to support said flexible case.

16. A flexible case adapted for storing at least one of a cellphone, radio or other electronic device, comprising:
- a case body comprising a back surface, a front surface and opposing stretchable lateral surfaces positioned therebetween that define a flexible sheath, said opposing stretchable lateral surfaces each having a first edge associated with said front panel and a second edge associated with said back panel to define a width of said opposing stretchable lateral surface; and
- a flexible sleeve associated with said opposing stretchable lateral surfaces, said at least one flexible sleeve includes a first edge, which coincides with said first edge of said opposing stretchable lateral surface, and a second edge, which coincides with said second edge of said opposing stretchable lateral surface such that said flexible sleeve spans said width of said at least one of said opposing stretchable lateral surface and is oriented substantially parallel to said opposing lateral surface when said flexible sleeve is positioned in a non-deflected state, and extends outwardly to accept and restrain a device for storage when the flexible sleeve is positioned in a second position of use.

17. The flexible case of claim 16, wherein said case body is further defined by at least one member interconnected to a lower end of said flexible sheath.

18. The flexible case of claim 16, further comprising a support member having a free end, a connecting end and opposing lateral edges positioned therebetween, said support member being reversibly bendable along substantially an entire length and interconnected on said connecting end to said flexible sheath, wherein said support member can be maintained substantially adjacent to said flexible sheath or selectively bent to either support or hang said flexible case in a plurality of positions.

19. The flexible case of claim 16, wherein said flexible sleeve is capable of resiliently deflecting to secure a handheld tool, a writing device, or a flashlight.

20. The flexible case of claim 16, wherein said case body is further defined by at least one support member interconnected to a lower end and
- said back surface, said at least one support member having at least one aperture.

* * * * *